United States Patent
Chen et al.

(10) Patent No.: US 10,212,107 B2
(45) Date of Patent: Feb. 19, 2019

(54) METHODS AND DEVICES FOR CONTROLLING MACHINES

(71) Applicant: Tencent Technology (Shenzhen) Company Limited, Shenzhen (CN)

(72) Inventors: Zhiqiang Chen, Shenzhen (CN); Hui Wang, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 273 days.

(21) Appl. No.: 15/186,097

(22) Filed: Jun. 17, 2016

(65) Prior Publication Data

US 2016/0301638 A1    Oct. 13, 2016

Related U.S. Application Data

(63) Continuation of application No. PCT/CN2015/070326, filed on Jan. 8, 2015.

(30) Foreign Application Priority Data

Jan. 24, 2014    (CN) .......................... 2014 1 0035197

(51) Int. Cl.
*H04L 12/58* (2006.01)
*H04L 29/08* (2006.01)
(Continued)

(52) U.S. Cl.
CPC ............ *H04L 51/046* (2013.01); *H04L 51/02* (2013.01); *H04L 51/32* (2013.01); *H04L 61/1594* (2013.01); *H04L 67/12* (2013.01)

(58) Field of Classification Search
USPC .................... 709/206, 204, 228, 217, 205
See application file for complete search history.

(56) References Cited

U.S. PATENT DOCUMENTS 8,775,647 B2 * 7/2014 Collart .............. G06F 17/30056
709/228
8,863,185 B2 * 10/2014 Stinson, III ........ H04N 5/44543
725/37
(Continued)

FOREIGN PATENT DOCUMENTS

CN    101436972 A    5/2009
CN    101894452 A    11/2010
(Continued)

OTHER PUBLICATIONS

Tencent Technology, ISRWO, PCT/CN2015/070326, Apr. 13, 2015, 8 pgs.

(Continued)

*Primary Examiner* — Jude Jean Gilles
(74) *Attorney, Agent, or Firm* — Morgan, Lewis & Bockius LLP

(57) ABSTRACT

Methods and devices for controlling machines are disclosed. A method for controlling machines is performed at an electronic device having one or more processors and memory. The method includes: providing a chat interface for a social network platform on the electronic device; providing a listing of social network contacts for a user account within the chat interface, the listing of social network contacts including at least a first contact that is a human user, and at least a second contact that is a machine; and establishing a chat session between the user account and the second contact which is the machine, wherein a chat message transmitted during the chat session causes the machine to perform a requested function of the machine.

17 Claims, 16 Drawing Sheets

(51) Int. Cl.
  *H04L 29/12*   (2006.01)
  *G06F 17/00*   (2006.01)
  *G06F 13/00*   (2006.01)

(56) References Cited

U.S. PATENT DOCUMENTS

| | | | |
|---|---|---|---|
| 9,201,927 B1* | 12/2015 | Zhang | G06F 17/271 |
| 9,203,924 B1* | 12/2015 | Gossweiler | H04L 67/306 |
| 9,292,878 B1* | 3/2016 | Gossweiler | G06Q 50/01 |
| 2009/0187630 A1* | 7/2009 | Narayanaswami | G06Q 10/107 |
| | | | 709/206 |
| 2011/0289011 A1* | 11/2011 | Hull | G06Q 10/107 |
| | | | 705/319 |
| 2012/0059884 A1* | 3/2012 | Rothschild | G06F 17/30873 |
| | | | 709/206 |
| 2012/0272287 A1* | 10/2012 | Kuhlke | H04W 4/21 |
| | | | 726/1 |
| 2014/0012905 A1* | 1/2014 | Roche | H04L 51/36 |
| | | | 709/204 |

FOREIGN PATENT DOCUMENTS

| | | |
|---|---|---|
| CN | 102196021 A | 9/2011 |
| CN | 102857516 A | 1/2013 |
| CN | 104144109 A | 11/2014 |
| CN | 104253861 A | 12/2014 |

OTHER PUBLICATIONS

Tencent Technology, IPRP, PCT/CN2015/070326, Jul. 26, 2016, 6 pgs.

* cited by examiner

Server System 108

**Electronic Device 104-1
(Serving as Control Device)**

Wherein the first information item specifying the first device type and the second information item specifying the second device type are received from a peripheral device transponder, and ~628 wherein the peripheral device transponder obtains the first information item from a first machine of the first device type, and the second information item from a second machine of the second device type.

Wherein the peripheral device transponder obtains the first information item by establishing physical or proximal contact with the first machine, and ~630 wherein the peripheral device transponder obtains the second information item by establishing physical or proximal contact with the second machine.

Figure 6E

METHODS AND DEVICES FOR CONTROLLING MACHINES

PRIORITY CLAIM AND RELATED APPLICATION

This application is a continuation application of PCT Patent Application No. PCT/CN2015/070326, entitled "METHODS AND DEVICES FOR CONTROLLING MACHINES" filed on Jan. 8, 2015, which claims priority to Chinese Patent Application No. 201410035197.2, entitled "Method, Apparatus, and System for Controlling Peripheral Devices" filed on Jan. 24, 2014, both of which are incorporated by reference in their entirety.

TECHNICAL FIELD

The present application relates to the field of Internet technologies, and in particular, to a method and device for controlling peripheral devices and/or equipment on a social network platform.

BACKGROUND

With the development of Internet technologies, communication among accounts becomes increasingly popular. On a social network platform, a user can exchange messages with another user or a group of users in substantially real time. The messages can be in textual or voice form. In addition to natural language messages, the users may also exchange media items, such as videos, pictures, files, etc. On a social network platform, a user may add one or more accounts of other users or public entities (e.g., weather services, traffic information services, taxi calling services, celebrities, government agencies, etc.) as his/her social network contacts, and exchange messages with these social network contacts.

SUMMARY

In existing Internet technologies, instant messaging communication on a social network platform can only be shared between accounts of human users. For example, a source account at a source terminal sends information to a target account, and a target terminal associated with the target account receives the information and then presents the information to a user of the target terminal. In such situations, the target terminal only displays the information or plays the information (e.g., in a chat interface). The target terminal is not a peripheral device or equipment that is controlled by the information sent to the target terminal. The information sent from the source terminal to the target terminal is not meant as an instruction for the target terminal to perform any operations, but rather as information for reading or viewing by a user of the target terminal. Based on the existing technology, the source account at the source terminal cannot control the target terminal using the information sent by the source terminal. Sometimes, the accounts of public entities may be provided by an automated program executed on a server which posts scheduled messages or provide answers in a query-response form (e.g., weather service). The automated program is specially designed to accept query messages of certain formats or natural language queries from other users. However, the server providing the automated program is also not a peripheral device or equipment that can be controlled by the user. The technology described herein is applied to controlling peripheral devices, equipment, and appliances that are of diverse types and that are capable of providing real-world functions through direct manipulation and interaction with a user. The technology described herein provides a better man-machine communication interface between a human user and such devices, equipment, and apparatus for the user to utilize them for their intended real-world functions.

The embodiments of the present disclosure provide methods and devices for controlling machines (e.g., peripheral devices, appliances, equipment, etc.) on a social network platform.

In some embodiments, a method for controlling machines is performed at an electronic device (e.g., electronic device 104, FIGS. 1A-1B and 3A-3B) having one or more processors and memory. The method includes: providing a chat interface for a social network platform on the electronic device; providing a listing of social network contacts for a user account within the chat interface, the listing of social network contacts including at least a first contact that is a human user, and at least a second contact that is a machine; and establishing a chat session, between the user account and the second contact which is the machine, wherein a chat message transmitted during the chat session causes the machine to perform a requested function of the machine.

In some embodiments, an electronic device (e.g., electronic device 104, FIGS. 1A-1B and 3A-3B), includes one or more processors, and memory storing one or more programs for execution by the one or more processors, the one or more programs include instructions for performing the operations of any of the methods described herein.

In some embodiments, a non-transitory computer readable storage medium storing one or more programs, the one or more programs comprising instructions, which, when executed by an electronic device (e.g., electronic device 104, FIGS. 1A-1B and 3A-3B), cause the electronic device to perform the operations of any of the methods described herein. In some embodiments, an electronic device (e.g., electronic device 104, FIGS. 1A-1B, and 3A-3B) includes means for performing, or controlling performance of the operations of any of the methods described herein.

Various advantages of the present application are apparent in light of the descriptions below.

BRIEF DESCRIPTION OF THE DRAWINGS

For a better understanding of the aforementioned aspects of the application as well as additional aspects and embodiments thereof, reference should be made to the Detailed Description below, in conjunction with the following drawings in which like reference numerals refer to corresponding parts throughout the figures.

FIGS. 6A-6E are flowchart diagrams illustrating a method of controlling machines in accordance with some embodiments.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The technical solutions of the present application will be clearly and completely described in the following with reference to the accompanying drawings. It is obvious that embodiments to be described are only a part rather than all of the embodiments of the present application. All other embodiments obtained by a person of ordinary skill in the art based on the embodiments of the present application without creative efforts shall fall within the protection scope of the present application.

In some embodiments of the present application, an electronic device for controlling machines includes a communication technology, for example, a radio frequency identification (RFID) technology, a near field communication (NFC) technology, a wireless local area network, an Internet or a mobile communication network. The electronic device may be a tablet computer, a mobile phone, an electronic reader, a remote control, a personal computer (PC), a laptop computer, a vehicle-mounted device, an Internet Protocol television, a wearable device, a household appliance, a video monitoring device, an instrument and meter device, a medical device, or other devices provided with a communication technology.

In some embodiments, a machine being controlled by the electronic device is provided with a communication technology, for example, an RFID technology, an NFC technology, a wireless local area network, the Internet or a mobile communication network. In some embodiments, the machine is coupled to a device, e.g., a transponder, for providing the above mentioned communication technology.

Figure 1A:
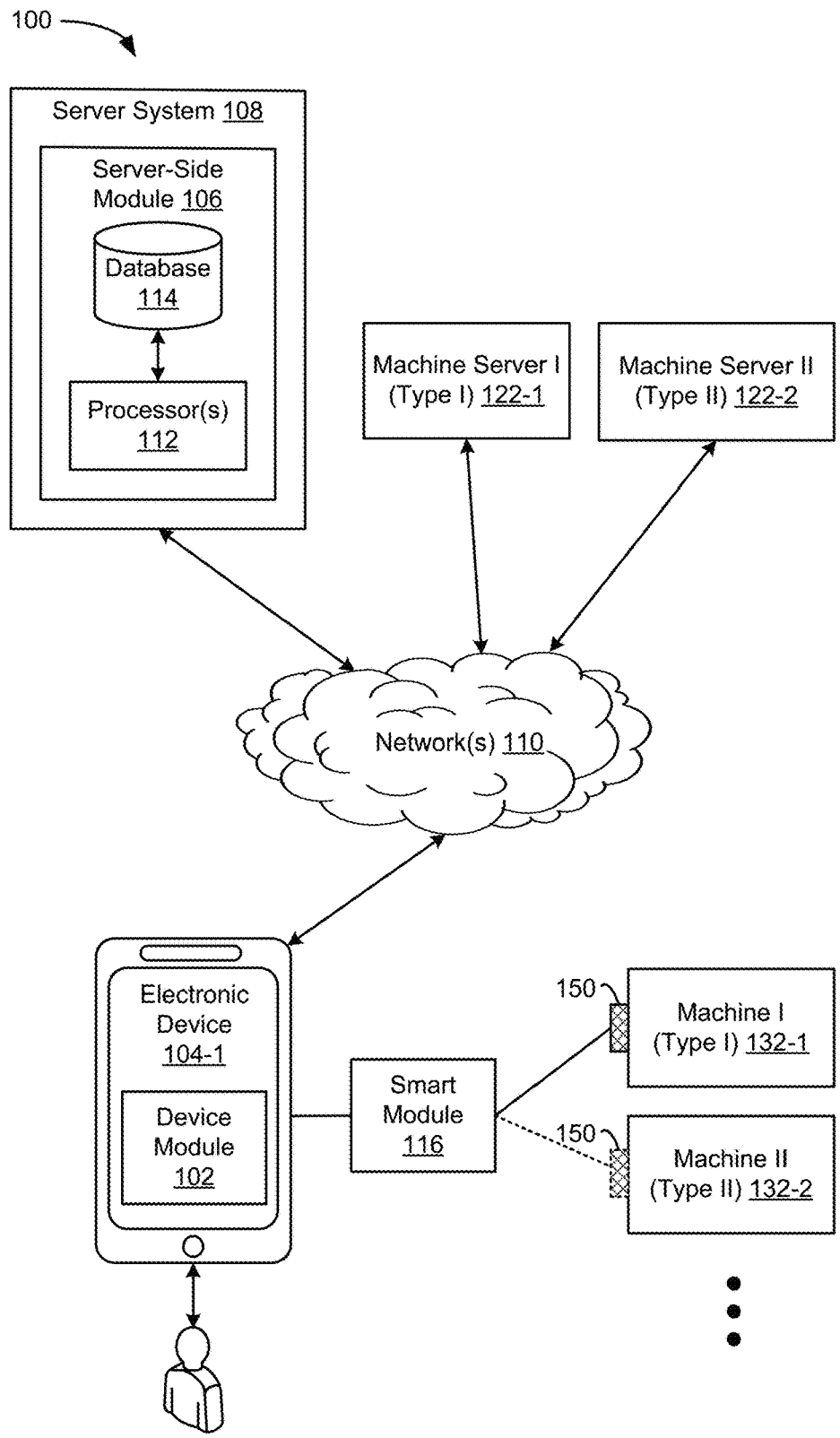
FIGS. 1A-1B are block diagrams illustrating exemplary embodiments of server-client environments in accordance with some embodiments.

FIG. 1A is a block diagram illustrating a server-client environment 100 in accordance with some embodiments. In some embodiments, server-client environment 100 includes device module 102 executed on an electronic device 104 (e.g., electronic device 104-1 or electronic device 104-2), and server-side module 106 executed on a server system 108 (e.g., for hosting a social network platform), machine servers 122-1, 122-2 (e.g., for performing machine command conversions) corresponding to different device types (e.g., type I and type II respectively), and communication network(s) 110 for interconnecting these components. Device module 102 provides client-side functionalities (e.g., instant messaging, and social networking services) and communication with server-side module 106. Server-side module 106 provides server-side functionalities (e.g., instant messaging, and social networking services) for any number of client modules 102 each residing on a respective client device 104.

In some embodiments, server-side module 106 includes one or more processors 112, one or more databases 114, an I/O interfaces (not shown) to one or more electronic devices 104 and machine servers 122. I/O interface to one or more electronic devices 104 facilitates the processing of input and output associated with the electronic devices for server-side module 106. One or more processors 112 obtain requests for performing account operations from one or more electronic devices 104, process the requests, identify usage data associated with the user account on the one or more client devices, verify the account information on the one or more client devices, and send the account verification results in response to the requests to device modules 102 of one or more electronic devices 104. The database 114 stores various information, including but not limited to, account information associated with each user account, device information associated with each device account, and usage data associated with each user account or device account on a certain electronic device. The database 114 may also store a plurality of record entries relevant to the activities of respective user accounts or respective device accounts. I/O interface to one or more machine servers 122 facilitates communication with one or more machine servers (e.g., machine manufacturer websites, machine command conversion services, and/or other processing services).

Examples of electronic device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIRE WIRE, Global System for Mobile Communication (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more stand-alone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108.

As shown in FIG. 1A, electronic device 104 is further coupled to an external smart module 116 which interacts with electronic device 104 wirelessly or via a hardware port or wire. In some embodiments, smart module 116 is established as a machine account on a social network platform by performing an interaction between electronic device 104 and external smart module 116.

In some embodiments as shown in FIG. 1A, smart module 116 is further coupled to one or more machines, such as machine 132-1 of a first type (type I), and machine 132-2 of a second type (type II). In some embodiments, machine 132 is a home appliance, such as a fridge, a stove, a thermostat, an alarm system, or a sprinkler system. In some embodiments, machine 132 is a peripheral device of electronic device 104, such as a printer, a fax machine, a tablet computer, a mobile phone, an electronic reader, a remote control, a PC, a laptop computer, a vehicle-mounted device, an Internet Protocol television, a wearable device, a household appliance, a video monitoring device, an instrument and meter device, a medical device. In some embodiments, machine 132 is equipment, such as an ultrasound scanner, an x-ray machine, a vehicle, etc. Smart module 116 may receive information from and/or send information to machines 132 via a communication technology, such as an RFID technology, an NFC technology, a wireless local area network, the Internet or a mobile communication network. In some embodiments, transponder 150 is used for communication between machines 132 and smart module 116. In some embodiments, transponder 150 is removable, and can form a physical or proximal contact with a first machine (e.g., machine 132-1) when the user account is exchanging information with the first machine, and form another contact with a second machine (e.g., machine 132-2) when the user account is exchanging information with the second machine.

Figure 1B:
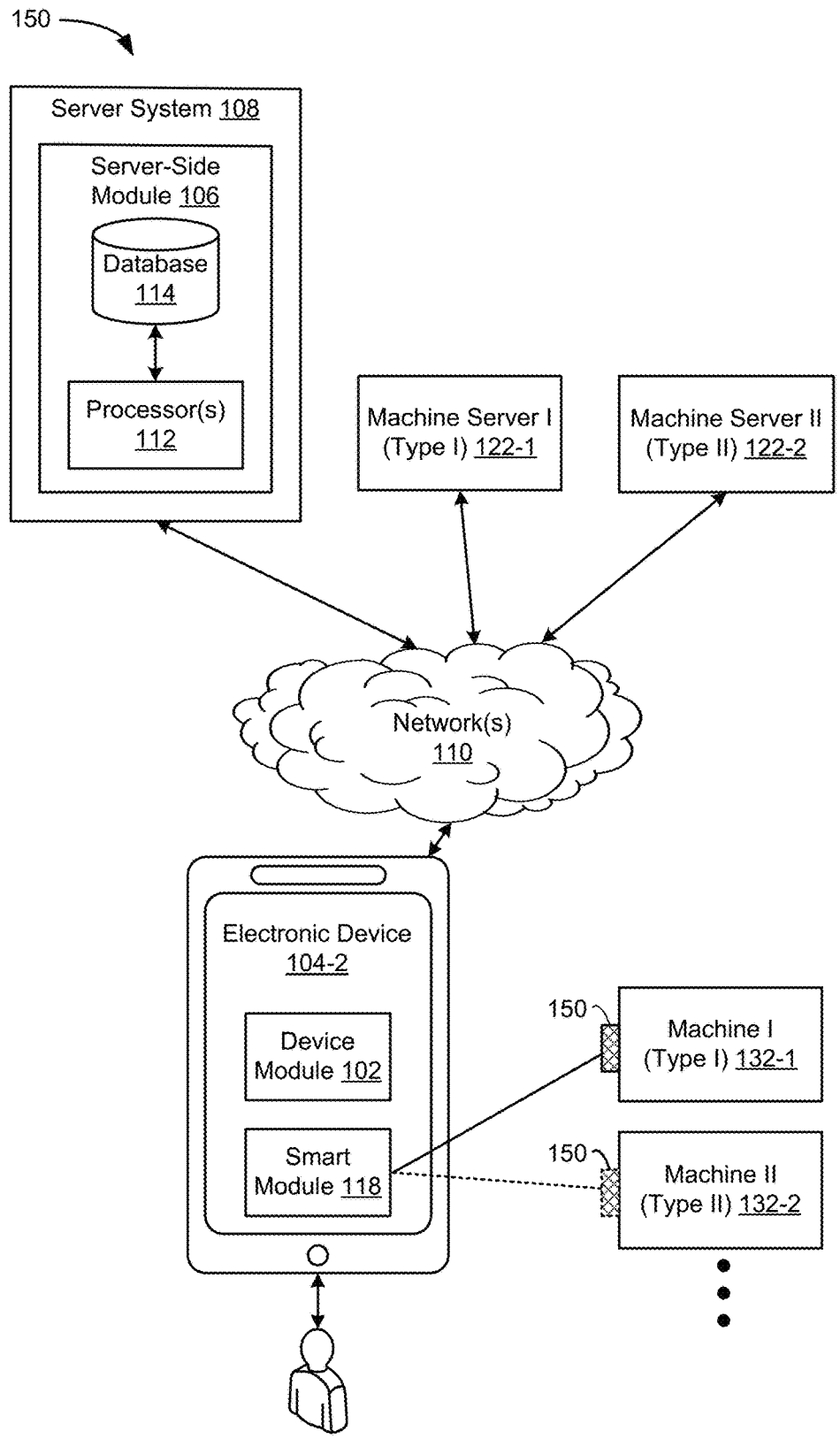

FIG. 1B is another block diagram illustrating a server-client environment 150 in accordance with some embodiments. While some example features are illustrated, various other features have not been illustrated for the sake of brevity and so as not to obscure more pertinent aspects of the example embodiments disclosed herein. To that end, as a non-limiting example, FIG. 1B shows electronic device 104-2 includes an internal smart module 118 (e.g., as a software module running on the electronic device, FIG. 3B). In some embodiments, one or more functionalities performed by internal smart module 118 are substantially similar to those discussed with respect to external smart module 116 of FIG. 1A. Internal smart module 118 is further coupled to one or more machines 132 via a transponder 150 using any suitable communication technologies as discussed in FIG. 1A.

Server-client environments shown in FIGS. 1A-1B include both a client-side portion (e.g., device module 102) and a server-side portion (e.g., server-side module 106). In some embodiments, data processing is implemented as a standalone application installed on electronic device 104. In addition, the division of functionalities between the client and server portions of client environment data processing can vary in different embodiments. For example, in some embodiments, device module 102 is a thin-client that provides only user-facing input and output processing functions, and delegates all other data processing functionalities to a backend server (e.g., server system 108).

Figure 2:
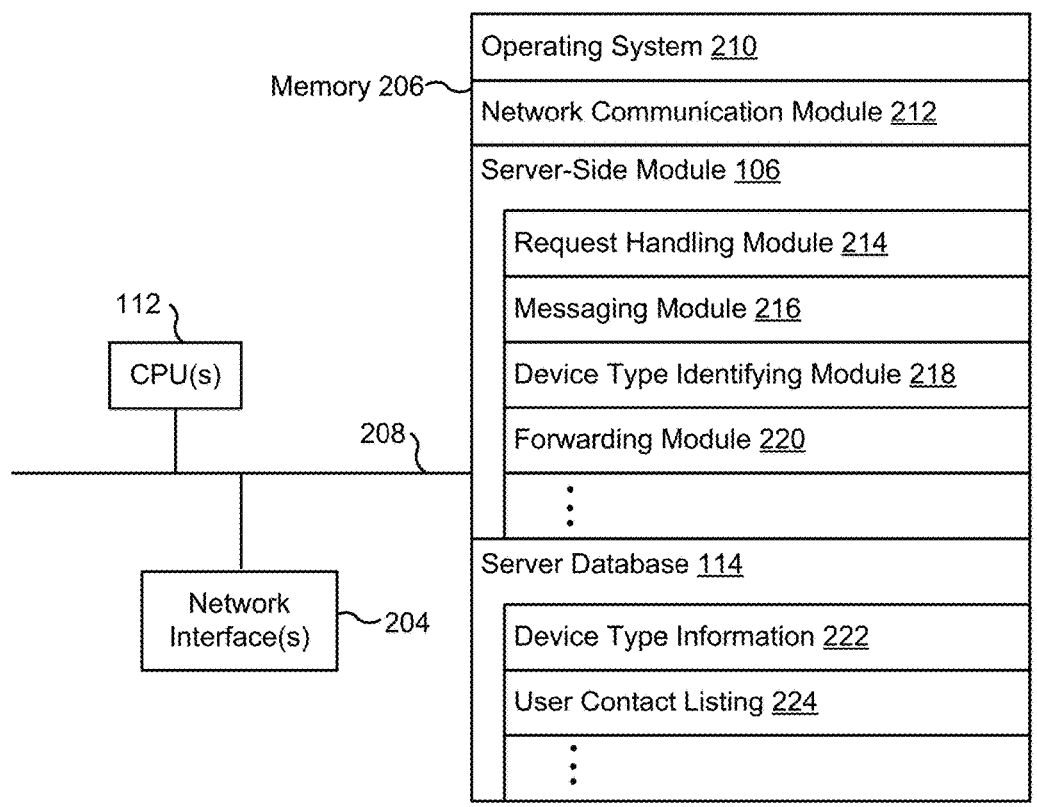
FIG. 2 is a block diagram of a server system in accordance with some embodiments.

FIG. 2 is a block diagram illustrating a server system 108 in accordance with some embodiments. Server system 108, typically, includes one or more processing units (CPUs) 112, one or more network interfaces 204 (e.g., including I/O interface), memory 206, and one or more communication buses 208 for interconnecting these components (sometimes called a chipset).

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 112. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

- operating system 210 including procedures for handling various basic system services and for performing hardware dependent tasks;
- network communication module 212 for connecting server system 108 to other computing devices (e.g., electronic devices 104 and/or machine servers 122) connected to one or more networks 110 via one or more network interfaces 204 (wired or wireless);
- server-side module 106, which provides server-side data processing (e.g., contact establishment verification, instant messaging, and social networking services), includes, but is not limited to:
  - request handling module 214 for handling and responding to various requests sent from electronic device 104, including requests for establishing a contact associated with a machine on a listing of social network contacts;
  - messaging module 216 for managing and routing messages sent between user accounts and machine contacts of the social networking platform;
  - device type identifying module 218 for identifying respective device types corresponding to different types of machines; and
  - forwarding module 220 for forwarding chat messages and other information received from electronic device 104 to corresponding machine servers 122 for conversion, and for forwarding machine commands converted by respective machine servers 122 to electronic device 104 to be forwarded to corresponding machines for execution; and
- one or more server database 114 storing data for the social networking platform, including but not limited to:
  - device type information 222 storing machine information of various machines, respective device types of corresponding machines, and respective machine servers for converting machine commands readable by the corresponding machines; and
  - user contact listing 224 storing a listing of social network contacts, including human contact(s) and machine contact(s), for a corresponding user account.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3A:
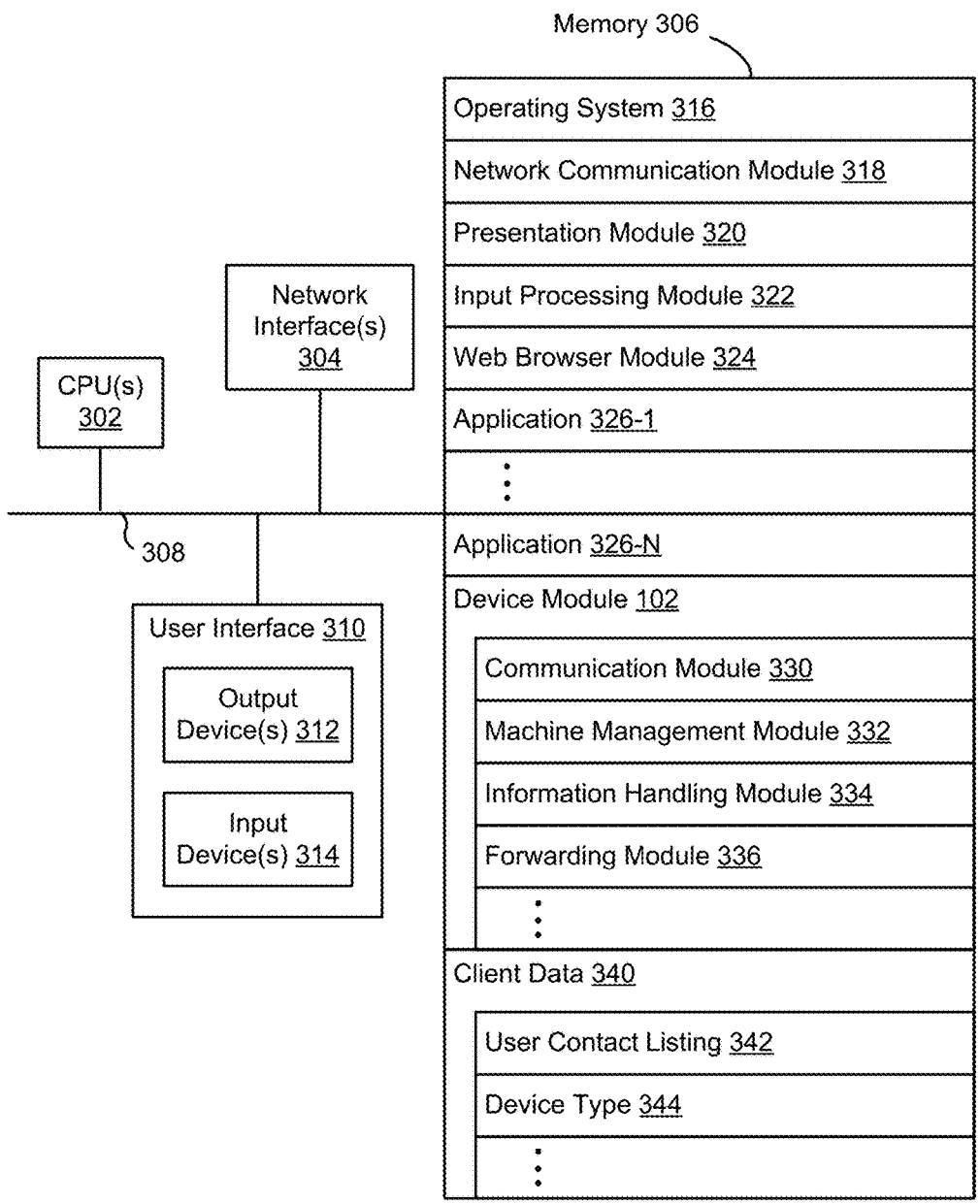
FIGS. 3A-3B are block diagrams illustrating exemplary embodiments of electronic devices in accordance with some embodiments.

FIG. 3A is a block diagram illustrating a representative electronic device 104 (e.g., electronic device 104-1, FIG. 1A) in accordance with some embodiments. Electronic device 104-1, typically, includes one or more processing units (CPUs) 302, one or more network interfaces 304, memory 306, and one or more communication buses 308 for interconnecting these components (sometimes called a chipset). Electronic device 104 also includes a user interface 310. User interface 310 includes one or more output devices 312 that enable presentation of media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a camera, a gesture capturing camera, or other input buttons or controls. Furthermore, some electronic devices 104 use a microphone and voice recognition or a camera and gesture recognition to supplement or replace the keyboard.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

- operating system 316 including procedures for handling various basic system services and for performing hardware dependent tasks;
- network communication module 318 for connecting electronic device 104 to other computing devices (e.g., server system 108 and machine servers 122) connected to one or more networks 110 via one or more network interfaces 304 (wired or wireless);
- presentation module 320 for enabling presentation of information (e.g., a user interface for a social networking platform, widget, webpage, game, and/or application, audio and/or video content, text, etc.) at electronic device 104 via one or more output devices 312 (e.g., displays, speakers, etc.) associated with user interface 310;
- input processing module 322 for detecting one or more user inputs or interactions from one of the one or more input devices 314 and interpreting the detected input or interaction;
- web browser module 324 for navigating, requesting (e.g., via HTTP), and displaying websites and web pages thereof;
- one or more applications 326-1-326-N for execution by client device 104 (e.g., games, application marketplaces, payment platforms, and/or other applications); and
- device module 102, which provides client-side data processing and functionalities for the social networking platform, including but not limited to:
  - communication module 330 for providing social network platform, sending messages to and receiving messages from other users of the social networking platform (e.g., instant messaging, group chat, message board, message/news feed, and the like);
  - machine management module 332 for associating and disassociating machine contact with different machine types, and exchanging information with smart module 116;
  - information handling module 334 for receiving information sent from machines, and identifying device type of the corresponding machines; and
  - forwarding module 336 for forwarding information received from one or more machines to server system 108, and for forwarding machine commands received from server system 108 to corresponding machines for execution by the corresponding machines; and
- client data 340 storing data associated with the social networking platform, including, but is not limited to:
  - user contact listing 342 storing a listing of social network contacts, including human contact(s) and machine contact(s), for a user account; and
  - device type 344 storing machine information of various machines, and respective device types of corresponding machines.

Figure 3B:
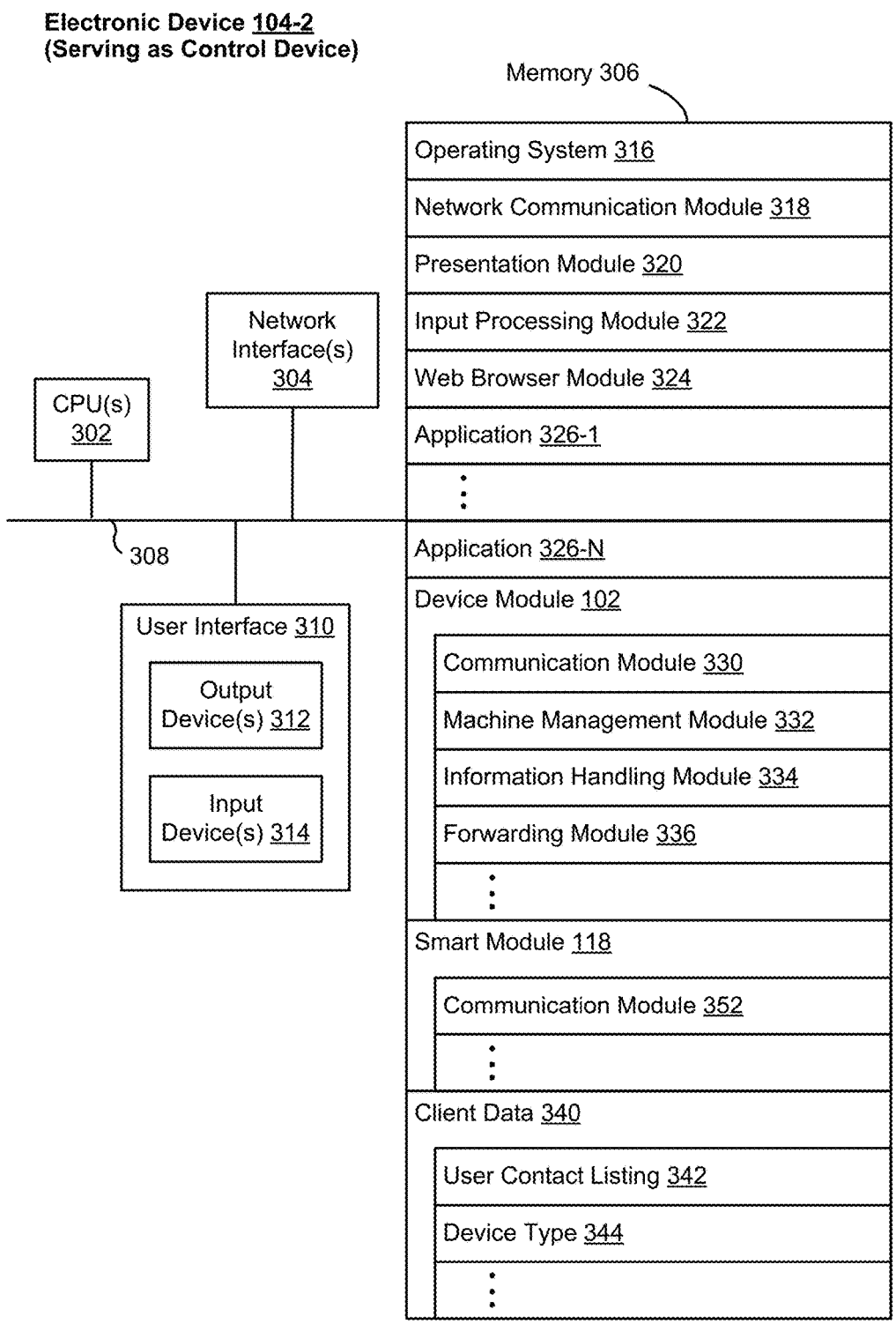

FIG. 3B is another block diagram illustrating an electronic device 104 (e.g., electronic device 104-2, FIG. 1B) in accordance with some embodiments. While some example features are illustrated, various other features have not been illustrated for the sake of brevity and so as not to obscure more pertinent aspects of the example embodiments disclosed herein. To that end, as a non-limiting example, FIG. 3B shows electronic device 104-2 includes an internal smart module 118 as a software module running on electronic device 104-2. In some implementations, internal smart module 118 stores the programs, modules, and data structures, or a subset or superset thereof:

- communication module 352 for receiving information from machines, forwarding information to electronic device 104, and for forwarding machine commands to corresponding machines for execution by the corresponding machines.

Each of the above identified elements may be stored in one or more of the previously mentioned memory devices, and corresponds to a set of instructions for performing a function described above. The above identified modules or programs sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some embodiments, at least some of the functions of server system 108 are performed by client device 104, and the corresponding sub-modules of these functions may be located within client device 104 rather than server system 108. In some embodiments, at least some of the functions of client device 104 are performed by server system 108, and the corresponding sub-modules of these functions may be located within server system 108 rather than client device 104. Client device 104 and server system 108 shown in FIGS. 2 and 3A-3B, respectively, are merely illustrative, and different configurations of the modules for implementing the functions described herein are possible in various embodiments.

Figure 4A:
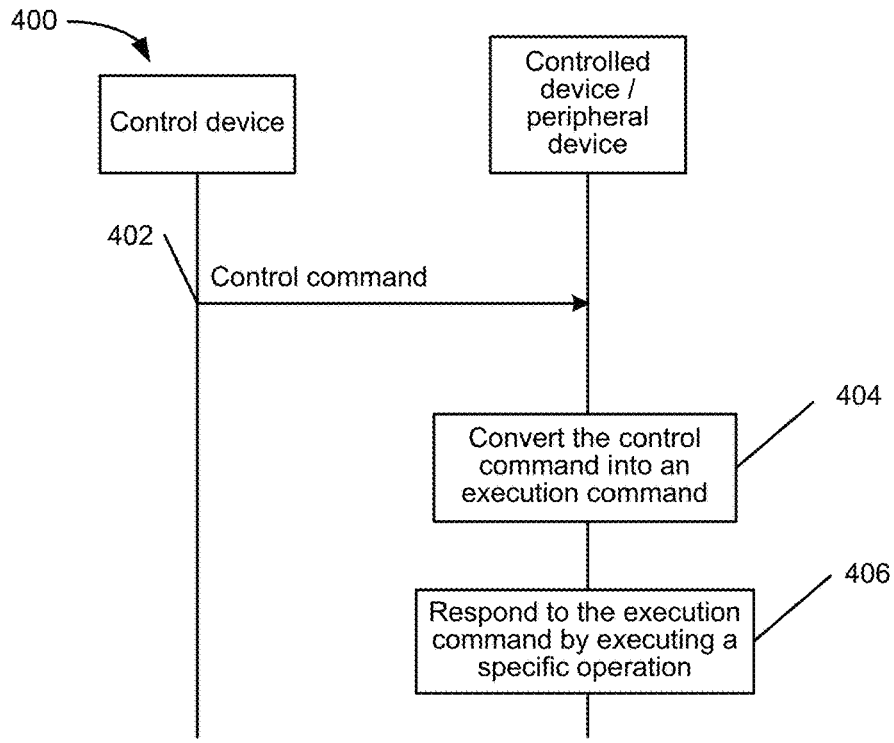
FIGS. 4A-4B are schematic diagrams of exemplary embodiments of device control methods in accordance with some embodiments.

FIG. 4A is a schematic diagram of a device control method 400 in accordance with some embodiments. A control device sends (402) a control command to a target communication account using a source communication account, where the control command is used for controlling a controlled device to execute a specific operation, and the controlled device is bound with the target communication account.

In some embodiments, the control device may specifically send the control command to the target communication account through an RFID technology; as the control command is sent through the RFID technology, it is possible that the control device does not log in to a communication platform through the source communication account and the controlled device also does not log in to the communication platform through the target communication account; instead, the control device directly opens an application program of a communication account and sends the control command directly to the target communication account through the RFID technology. In addition, the control device may specifically send the control command to the target communication account through the NFC technology, and similarly, it is possible that the control device does not log in to the communication platform through the source communication account, and the controlled device also does not log in to the communication platform through the target communication account. In addition, the control device may specifically send the control command to the target communication account through a wireless network.

In some embodiments, the binding of the controlled device and the target communication account may specifically be a permanent binding, or may also be a short-term binding, of the controlled device and the target communication account. For example, the target communication account is a communication account built in an RFID label, so that when the control device needs to control a household appliance, the RFID label may be attached on the household appliance to implement communication between the control device and the household appliance; when the control device needs to control an instrument and meter device, the RFID label may be removed from the household appliance and attached on the instrument and meter device to implement communication between the control device and the instrument and meter device.

In some embodiments, the controlled device receives the control command through the target communication account, and converts (404) the control command into an execution command that can be executed by the controlled device.

In some embodiments, when receiving the control command, the controlled device may convert the control command into an execution command executable by the controlled device. For example, the control command is a character string, for example, "adjust the temperature to 26 degrees", in which case, when receiving the control command, the controlled device converts the character string into an execution command executable by the controlled device to adjust the temperature to 26 degrees.

In some embodiments, the controlled device responds (406) to the execution command by executing the specific operation. In some embodiments, after the execution command is obtained by conversion in step 404, the command may be executed in step 406. In some embodiments, the target communication account may be a communication account in a friends list of the source communication account. In addition, the target communication account may also be a communication account applied for by the source communication account to the communication platform, and then the target communication account is bound on the controlled device by an operation of a user.

In some embodiments, step 402 may specifically include sending, by a control device, a control command to a target communication account using a source communication account through an RFID technology, where a controlled device includes an RFID label, and the target communication account is built in the RFID label.

In some embodiments, before the control device controls the controlled device through a communication account, a user may attach the RFID label onto the controlled device, so that the controlled device may read the command of the communication account in the RFID label with an RFID module.

In this way, it can be implemented that the control device sends the control command to the RFID label by using the source communication account through the RFID technology, and the controlled device reads the control command in the RFID label. Therefore, it is implemented that the control device controls the controlled device by using the communication account through the RFID technology.

In some embodiments, step 402 may specifically include: sending, by the control device, the control command to a transit communication account by using the source communication account, where the control device logs in to the communication platform through the source communication account; receiving, by a transit device, the control command through the transit communication account, where the transit device logs in to the communication platform through the transit communication account; and sending, by the transit device, the control command to the target communication account by using the transit communication account through the RFID technology.

In some embodiments, the transit device may be an RFID reader, and the RFID reader logs in to the communication platform through the transit communication account. In this implementation, it can be implemented that a control device sends a control command to a transit device through a wireless network, and the transit device then sends the control command to a controlled device through an RFID technology. For example, a user of a control device is in an office, but the user wants to control a household appliance at home. In this case, the user may send a control command used for controlling the household appliance with the control device to a transit communication account of a transit device; when receiving the control command, the transit device may send the control command to a target communication account through an RFID technology; after the household appliance receives the control command, the control of the household appliance may be implemented.

In some embodiment, step 402 may include: sending, by the control device, the control command to the target communication account using the source communication account through an NFC technology, where the controlled device includes an NFC chip, and the target communication account is built in the NFC chip. In some embodiments, before the control device controls the controlled device through the communication account, a user may install the NFC chip on the controlled device, so that the controlled device may read the command of the communication account in the NFC chip. In this way, it can be implemented that the control device sends the control command to the NFC chip by using the source communication account through the NFC technology, and the controlled device reads the control command in the NFC chip. Therefore, it is implemented that the control device controls the controlled device by using the communication account through the NFC technology.

In some embodiment, step 402 may specifically include: sending, by the control device, the control command to the transit communication account by using the source communication account, where the control device logs in to a communication platform through the source communication account; receiving, by a transit device, the control command through the transit communication account, where the transit device logs in to the communication platform through the transit communication account; and sending, by the transit device, the control command to the target communication account by using the transit communication account through the NFC technology.

In some embodiment, the transit device may be a device including an NFC chip, and the device logs in to the communication platform through the transit communication account, in this implementation manner, it can be implemented that a control device sends a control command to a transit device through a wireless network, and the transit device then sends the control command to a controlled device through an RFID technology. For example: a user of a control device is in an office, but the user wants to control a household appliance at home. In this case, the user may send a control command used for controlling the household appliance with the control device to a transit communication account of a transit device; when receiving the control command, the transit device may send the control command to a target communication account through the RFID technology; after the household appliance receives the control command, the control of the household appliance may be implemented.

In some embodiment, step 402 may specifically include; sending, by a control device, a control command to a target communication account by using a source communication account through a wireless network, where the control device logs in to a communication platform through the source communication account, and the control device logs in to the communication platform through the target communication account.

In some embodiment, the wireless network may specifically be a wireless local area network, the Internet or a mobile communication network. When the wireless network is a wireless local area network, the communication platform may be a device establishing the wireless local area network, for example, a wireless router. When the wireless network is the Internet or a mobile communication network, the communication platform may be a server. In this implementation manner, it can be implemented that a control device controls a controlled device by using a communication account through a wireless network, so that the distance of controlling the controlled device is extended; for example, a household appliance at home is controlled from an office, and the like.

In some embodiment, step 402 may specifically include: receiving, by the controlled device, the control command through the target communication account, determining whether the source communication account has a right to control the controlled device, and if yes, converting the control command into an execution command that can be responded to by the controlled device.

In some embodiment, when the controlled device determines that the source communication account does not have the right to control the controlled device, the controlled device may ignore the control command. In some embodiment, the controlled device may specifically preset a specific communication account with the right to control the controlled device, and when the control command sent by the source communication account is received, determine whether the source communication account is the specific communication account, and if yes, determine that the source communication account has the right to control the controlled device.

In some embodiments, before step 402, the method may further include: generating, by a control device, a control command. In some embodiment, the control command may be generated when the control device receives an operation inputted by a user; for example, when needing to control a controlled device, the user may input an operation on the control device to generate the control command. In addition, in the step, the control command may be generated automatically by the control device. For example, the control device is a refrigerator, and when detecting that there is an excessively small amount of food in the refrigerator, the refrigerator may send a control command for buying food to a target communication account bound with a computer through a bound source communication account. The computer receives the control command and converts the control command into an execution command, so as to send an order for buying food to an e-commerce seller and complete a payment operation. The e-commerce seller may send food to an address of the computer according to the order.

In some embodiment, scenarios applicable to the method include, but are not limited to, the application scenarios listed in the following:

Scenario 1. The controlled device is a camera, and the control command is used for real-time transmission of video images by the camera, so that video monitoring may be implemented by real-time video communication established by performing communication with communication accounts bound with different cameras, and comprehensive monitoring may be implemented by establishing a group to implement management of multiple cameras.

Scenario 2. The controlled device is a data processor used for managing multiple meters of tap water and gas, and the control command is used for returning a degree of each meter by the data processor. For example, a sensor is installed on each meter, the sensor transits a meter reading to a data processor of a building or of a whole residential area, and the data processor may update the degree of each meter. When a meter reader adds a communication account bound with the data processor with the control device, the control device may download packed data according to the method, and then forward the data to a billing system to complete billing and settlement, or may complete billing and settlement directly.

Scenario 3. The controlled device is an intelligent household appliance or an electrical device. A communication account bound with the intelligent household appliance or the electrical device is added, so that applications, such as online purchase of fresh produce, adjustment of indoor temperature, power control of the household appliance, a video link obtained with the control device, and remote control of a computer at home to perform a download, may be implemented.

Scenario 4. The control device is a medical data processing device. After a bound communication account of the medical data processing device is added, a user puts on intelligent tights; all data is collected by a sensor and then transmitted to the medical data processing device; the medical data processing device analyzes a physical condition of the user by using a data model, obtains a highly accurate diagnosis by searching a case library for data recorded from manual diagnoses and making a comparison, and generates a treatment prescription; next, the medical data processing device controls the controlled device to complete purchase of a drug through an e-commerce platform.

In the technical solution, a control device sends a control command to a target communication account using a source communication account, where the control command is used for controlling a controlled device to execute a specific operation; the controlled device receives the control command through the target communication account, and converts the control command into an execution command which can be responded to by the controlled device; the controlled device responds to the execution command to execute a specific operation. Therefore, the embodiment of the present application may implement the control device through a communication account.

Figure 4B:
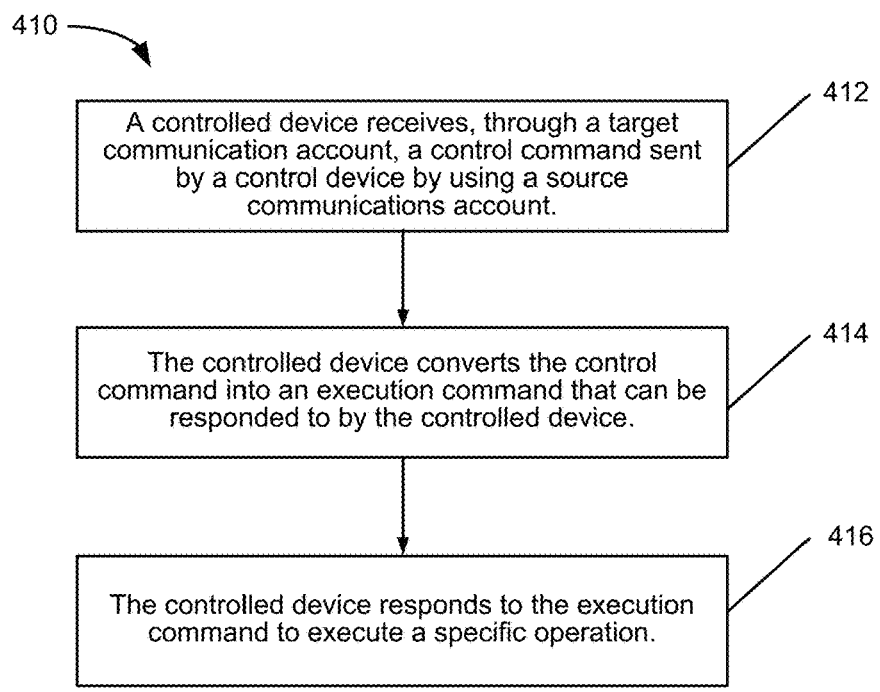

FIG. 4B is a schematic flow chart of another device control method 410 according to some embodiments. A controlled device receives (412), through a target communication account, a control command sent by a control device using a source communication account, where the control command is used for controlling the controlled device to execute a specific operation, and the controlled device is bound with the target communication account. The controlled device converts (404) the control command into an execution command which can be responded to by the controlled device. The controlled device responds (416) to the execution command to execute the specific operation. In some embodiments, the controlled device may receive the control command through an RFID technology, an NFC technology, a wireless local area network, the Internet or a mobile communication network. Therefore, device control may be implemented through a communication account.

Figure 4C:
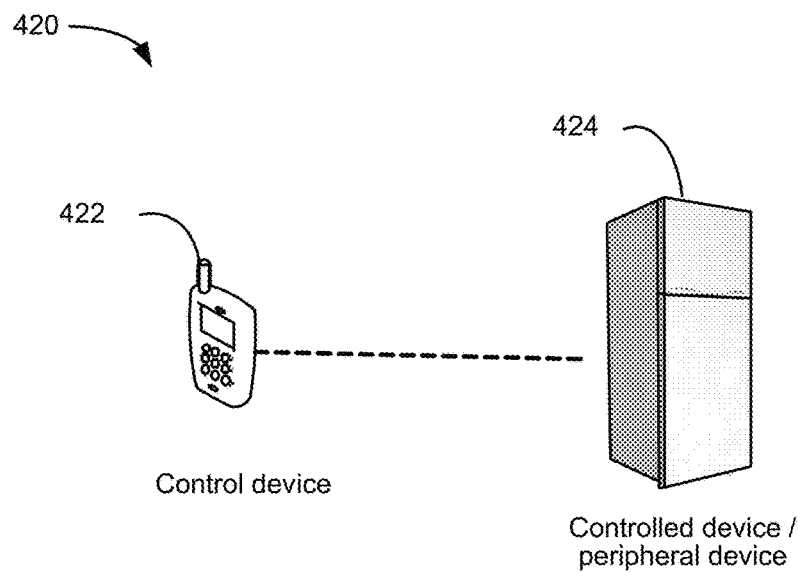
FIGS. 4C-4D are schematic structural diagrams of exemplary embodiments of device control systems in accordance with some embodiments.

FIG. 4C is a schematic structural diagram of a device control system 420 according to some embodiments. As shown in FIG. 4C, the device control system 420 includes: a control device 422 and a controlled device 424. In the system, the control device 422 is used for sending a control command to a target communication, account by using a source communication account, where the control command is used for controlling the controlled device 424 to execute a specific operation, and the controlled device 424 is bound with the target communication account.

In some embodiments, the control device 422 may specifically send the control command to the target communication account through an RFID technology; as the control command is sent through the RFID technology, it is possible that the control device 422 does not log in to a communication platform through the source communication account, and the controlled device 424 also does not log in to the communication platform through the target communication account; instead, the control device 422 directly opens an application program of a communication account and sends the control command directly to the target communication account through the RFID technology. In addition, the control device 422 may specifically send the control command to the target communication account through the NFC technology, and similarly, it is possible that the control device 422 does not log in to the communication platform through the source communication account, and the controlled device 424 also does not log in to the communication platform through the target communication account. In addition, the control device 422 may specifically send the control command to the target communication account through a wireless network.

In some embodiments, the binding of the controlled device 424 and the target communication account may specifically be a permanent binding, or may also be a short-term binding, of the controlled device 424 and the target communication account. For example, the target communication account is a communication account built in an RFID label, so that when the control device 422 needs to control a household appliance, the RFID label may be attached on the household appliance to implement communication between the control device 422 and the household appliance; when the control device 422 needs to control an instrument and meter device, the RFID label may be removed from the household appliance and attached on the instrument and meter device to implement communication between the control device 422 and the instrument and meter device.

The controlled device 424 is used for receiving the control command through the target communication account, converting the control command into an execution command that can be responded to by the controlled device 424, and responding to the execution command to execute the specific operation.

In some embodiments, when receiving the control command, the controlled device 424 may convert the control command into an execution command executable by the controlled device 424. For example, the control command is a character string, for example, "adjust the temperature to 26 degrees", in which case, when receiving the control command, the controlled device 424 converts the character string into an execution command executable by the controlled device 424 to adjust the temperature to 26 degrees.

In some embodiments, the target communication account may be a communication account in a friends list of the source communication account. In addition, the target communication account may also be a communication account applied for by the source communication account to the communication platform, and then the target communication account is bound on the controlled device 424 by an operation of a user.

In some embodiments, a control device 422 may further send a control command to a target communication account by using a source communication account through an RFID technology, where a controlled device 424 includes an RFID label, and the target communication account is built in the RFID label.

In some embodiments, before the control device 422 controls the controlled device 424 through a communication account, a user may attach the RFID label onto the controlled device 424, so that the controlled device 424 may read the command of the communication account in the RFID label with an RFID module.

In this way, it can be implemented that the control device 422 sends the control command to the RFID label using the source communication account through the RFID technology, and the controlled device 424 reads the control command in the RFID label. Therefore, it is implemented that the control device 422 controls the controlled device 424 using the communication account through the RFID technology.

Figure 4D:
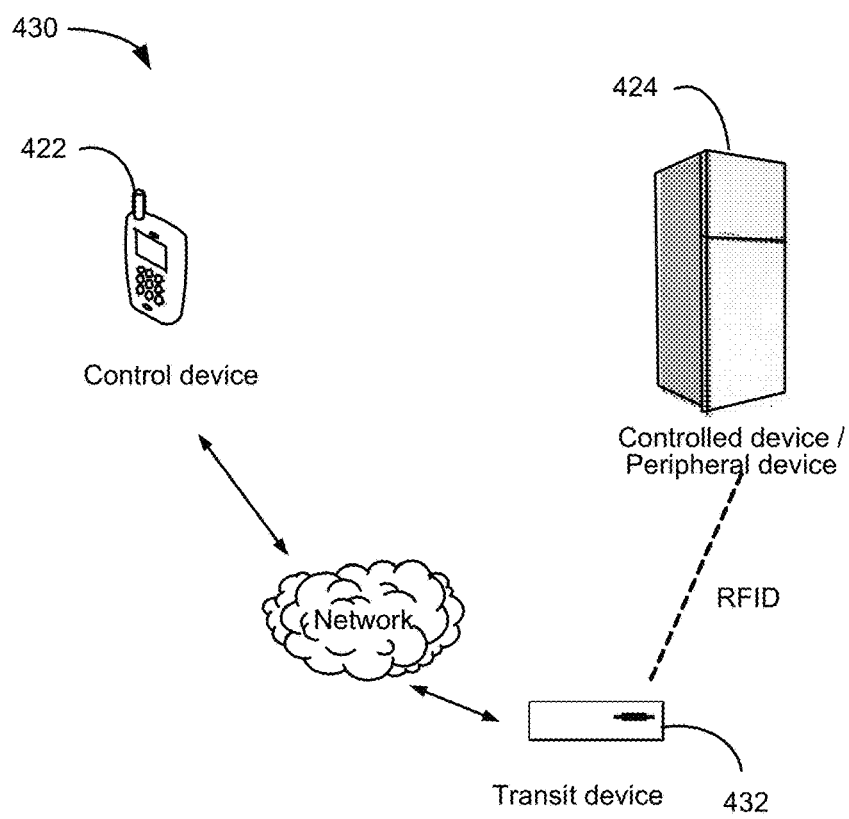

In some embodiments, as shown in FIG. 4D, the system 430 further includes a transit device 432. The control device 422 may be further used for sending the control command to a transit communication account by using the source communication account, where the control device 422 logs in to a communication platform through the source communication account.

The transit device 432 is used for receiving the control command through the transit communication account, and sending the control command to the target communication account by using the transit communication account through the RFID technology, where the transit device logs in to the communication platform through the transit communication account. In some embodiments, the transit device 432 is an RFID reader, and the RFID reader logs in to the communication platform through the transit communication account.

In this implementation manner, it can be implemented that a control device 422 sends a control command to a transit device 432 through a wireless network, and the transit device 432 then sends the control command to a controlled device 424 through an RFID technology. For example, a user of the control device 422 is in an office, but the user wants to control a household appliance at home; therefore, the user may send a control command used for controlling the household appliance to a transit communication account of the transit device 432 with the control device 422, and the transit device 432, when receiving the control command, may send the control command to a target communication account through the RFID technology, and after receiving the control command, the household appliance may complete the control of the household appliance.

In another embodiment, the control device 422 may be further used for sending a control command to a target communication account by using a source communication account through the near field communication NFC technology, where the controlled device 424 includes an NFC chip, and the target communication account is built in the NFC chip. Specifically, before the control device 422 controls the controlled device 424 through a communication account, a user may install an NFC chip on the controlled device 424, so that the controlled device 424 may read the command of the communication account in the NFC chip.

In this way, it can be implemented that the control device 422 sends a control command to the NFC chip by using the source communication account through the NFC technology, and the controlled device 424 reads the control command in the NFC chip. Therefore, it is implemented that the control device 422 controls the controlled device 424 by using the communication account through the NFC technology.

In another embodiment, the control device 422 may further send a control command to a target communication account by using a source communication account through the wireless network, where the control device 422 logs in to a communication platform through the source communication account, and the control device 422 logs in to the communication platform through the target communication account.

In some embodiments, the wireless network may specifically be a wireless local area network, the Internet or a mobile communication network. When the wireless network is a wireless local area network, the communication platform may be a device establishing the wireless local area network, for example, a wireless router. When the wireless network is the Internet or a mobile communication network, the communication platform may be a server.

In this implementation manner, it can be implemented that the control device 422 controls the controlled device 424 using a communication account through the wireless network, so that the distance of controlling the controlled device 424 is extended; for example, a household appliance at home is controlled from an office, and the like.

In some embodiments, the controlled device 424 may be further used for receiving the control command through the target communication account, determining whether the source communication account has a right to control the controlled device, and if yes, converting the control command into an execution command that can be responded to by the controlled device 424.

In some embodiments, when the controlled device 424 determines that the source communication account does not have the right to control the controlled device 424, the controlled device 424 may ignore the control command.

In some embodiments, the controlled device 424 may specifically preset a specific communication account with the right to control the controlled device 424, and when the control command sent by the source communication account is received, determine whether the source communication account is the specific communication account, and if yes, determine that the source communication account has the right to control the controlled device 424.

In some embodiments, the control device 422 may be further used for generating the control command. The control command may be specifically generated when the control device 422 receives an operation inputted by a user; for example, when needing to control the controlled device 424, the user may input an operation on the control device 422 to generate the control command. In addition, in the step, the control command may specifically be generated automatically by the control device 422; for example, the control device 422 is a refrigerator, and when detecting that there is an excessively small amount of food in the refrigerator, the refrigerator may send a control command for buying food to a target communication account bound with a computer through a bound source communication account. The computer receives the control command and converts the control command into an execution command, so as to send an order for buying food to an e-commerce seller and complete a payment operation. The e-commerce seller may send food to an address of the computer according to the order.

In some embodiments, a control device 422 sends a control command to a target communication account by using a source communication account, and the control command is used for controlling a controlled device 424 to execute a specific operation; the controlled device 424 receives the control command through the target communication account, and converts the control command into an execution command that can be responded to by the controlled device 424; the controlled device 424 responds to the execution command to execute the specific operation. Therefore, the embodiment of the present application can implement the control device 422 through a communication account.

Figure 4E:
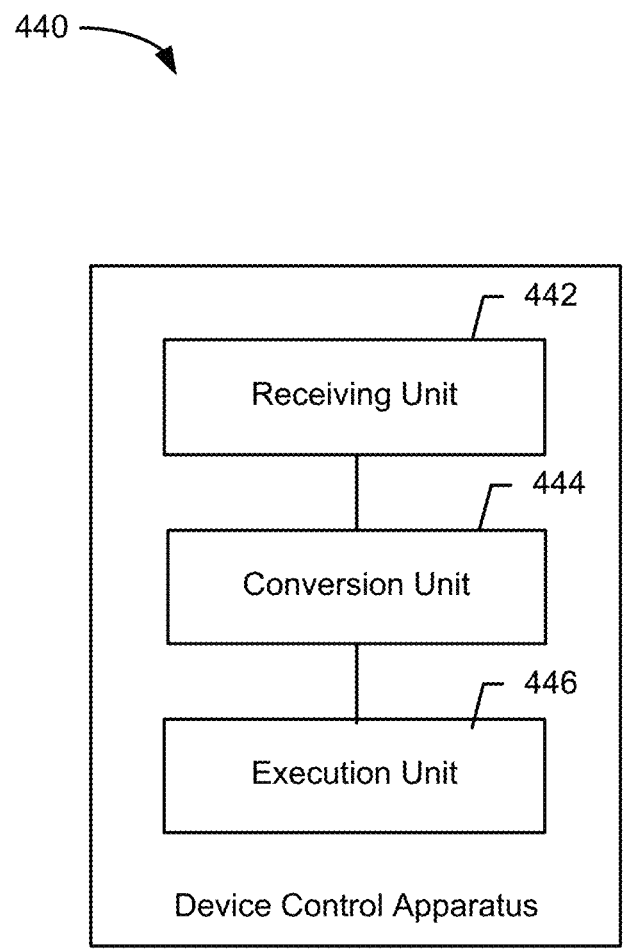
FIG. 4E is a schematic structural diagram of a device control apparatus in accordance with some embodiments.

FIG. 4E is a schematic structural diagram of a device control apparatus 440 according to some embodiments. The device control apparatus 440 includes: a receiving unit 442, a conversion unit 444, and an execution unit 446.

The receiving unit 442 is used for receiving, through a target communication account, a control command sent by a control device by using a source communication account, where the control command is used for controlling the apparatus to execute a specific operation, and the apparatus is bound with the target communication account. The conversion unit 444 is used for converting the control command into an execution command that can be responded to by the controlled device. The execution unit 446 is used for responding to the execution command to execute the specific operation.

In some embodiments, the apparatus may specifically receive the control command through an RFID technology, an NFC technology, a wireless local area network, the Internet or a mobile communication network. For a specific implementation manner, reference may be made to this embodiment, which is no longer repeatedly described herein.

In some embodiments, the apparatus may specifically be the controlled device applied in the description of the foregoing embodiment. In some embodiments, a control command sent by a control device by using a source communication account is received through a target communication account, and the control command is used for controlling the apparatus to execute a specific operation; the control command is converted into an execution command that can be responded to by the controlled device; the execution command is responded to, so as to execute the specific operation. Therefore, device control may be implemented through a communication account.

Figure 5A:
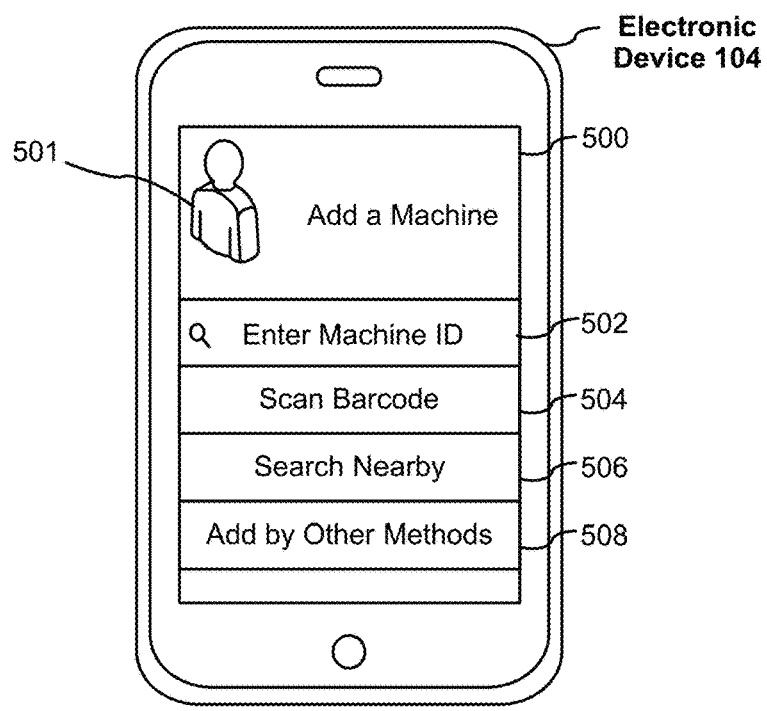
FIGS. 5A-5E are exemplary embodiments of user interfaces of controlling machines in accordance with some embodiments.

FIG. 5A is an exemplary embodiment of a user interface 500 for adding a machine (e.g., a smart module 116 of FIG. 1A) as a contact on a social network platform. A machine is added to a listing of social network contacts for a user account 501 using different methods. In some embodiments, an identifier of the machine is received by the user manually entering (502) the identifier. In some embodiments, the machine is added as a contact by using the electronic device to scan (504) a barcode of the machine. In some embodiments, the machine is added by searching (506) nearby available machines, or other suitable methods (508).

Figure 5B:
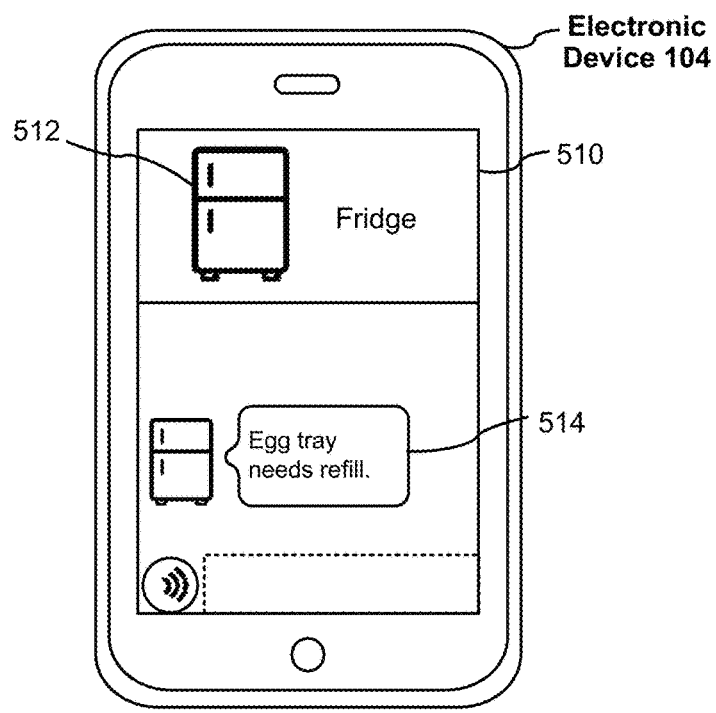

FIG. 5B is an exemplary embodiment of a chat interface 510 between user account 501 and machine contact 512 for receiving a message 514 from machine contact 512. In some embodiments, after adding a smart module as a machine contact, the smart module is associated with a fridge. Thus, electronic device 104 displays the machine contact 512 using an avatar indicating the machine type of a fridge. In some embodiments during a chat session between machine contact 512 and user account 501, the fridge equipped with a sensor detects the egg tray needs to be refilled with more eggs, machine contact 512 may send a machine message, which is then converted into a human readable text message 514 by a corresponding machine server 122 which is capable of converting machine command executable by a fridge into a human readable text message. The text message 514 is then displayed on client device 104.

Figure 5C:
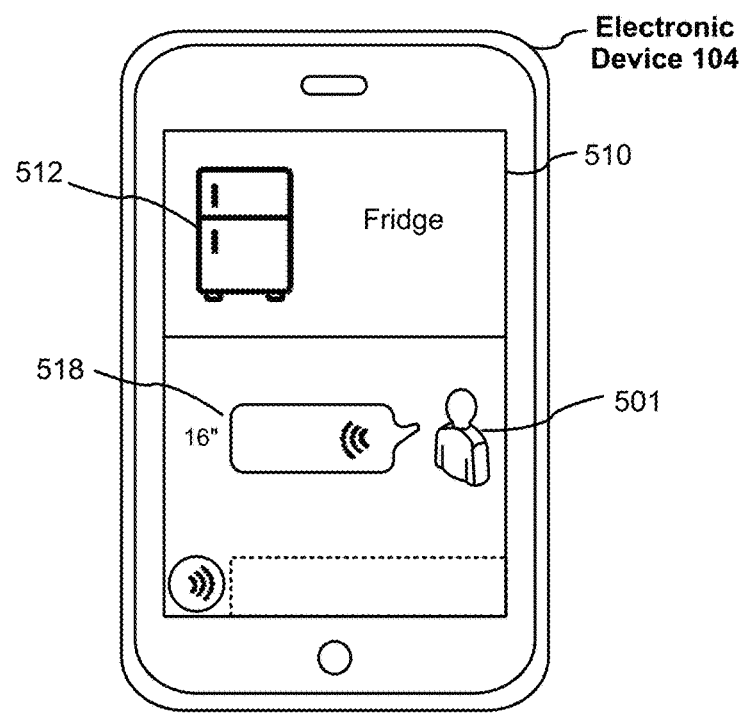

FIG. 5C is an exemplary embodiment of the chat interface 510 for sending an audio chat message 518 from user account 501 to machine contact 512. In some embodiments, the audio chat message 518 includes an instruction to be executed by the machine associated with machine contact 512. The audio chat message 518 may be converted into a text message by server system 108, and forwarded to a corresponding machine server 122 to be converted into a machine command. The machine command is then forwarded to the machine associated with machine contact 512 for execution.

Figure 5D:
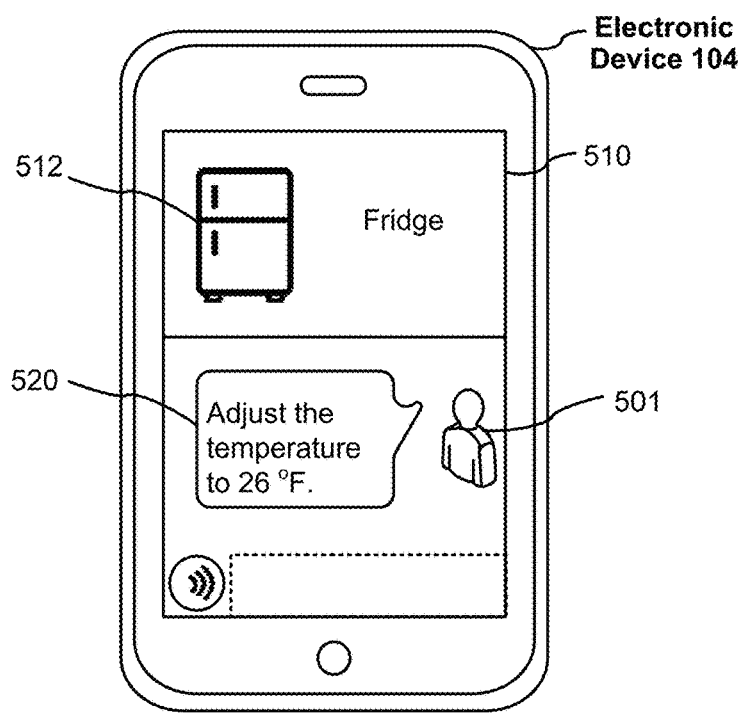

FIG. 5D is an exemplary embodiment of a chat interface 510 for sending a chat message 518 from user account 501 to machine contact 512. Chat message 518 includes an instruction for adjusting the temperature of the fridge to 26° F. After the instruction in chat message 518 is converted into machine readable command and forwarded to the fridge associated with machine contact 512, the fridge may automatically adjust its temperature for food storage to 26° F.

Figure 5E:
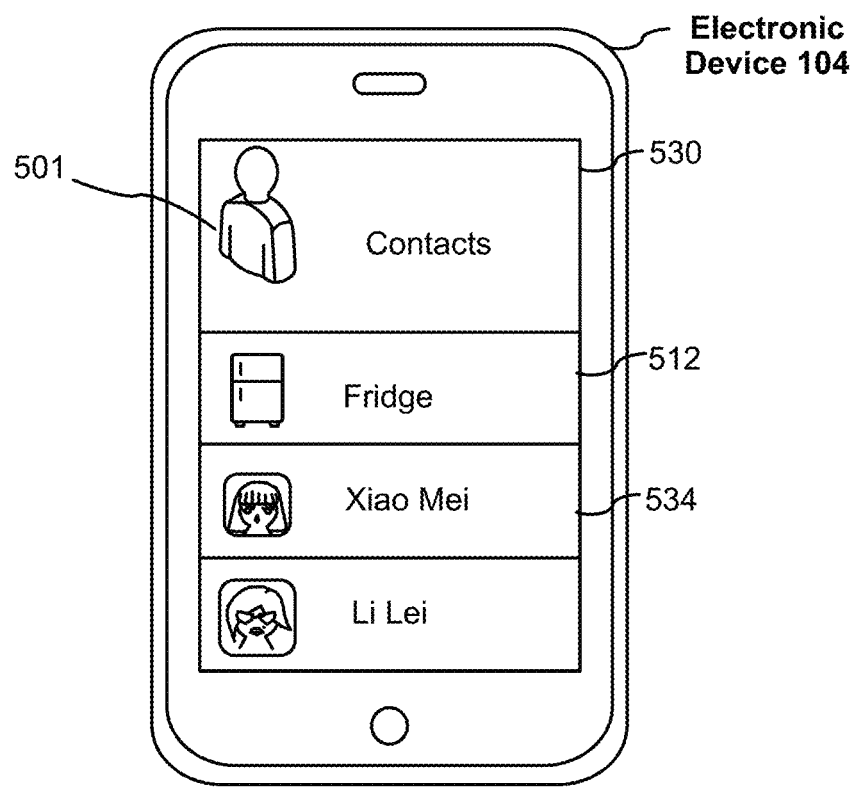

FIG. 5E is an exemplary embodiment of a listing 530 of social network for user account 501 within the chat interface. As shown in FIG. 5E, the listing 530 includes a human contact 534 (e.g., Xiao Mei), and a machine contact 512 (e.g., a fridge).

FIGS. 6A-6E illustrate a flowchart diagram of a method 600 for controlling machines in accordance with some embodiment. In some embodiments, method 600 is performed by electronic device 104 with one or more processors and memory. For example, in some embodiments, method 600 is performed by electronic device 104 (FIGS. 1A-1B, and 3A-3B) or a component thereof. In some embodiments, method 600 is governed by instructions that are stored in a non-transitory computer readable storage medium and the instructions are executed by one or more processors of the electronic device. Optional operations are indicated by dashed lines (e.g., boxes with dashed-line borders).

In method 600, an electronic device provides (602) a chat interface (e.g., chat interface 510 of FIGS. 5B-5D) for a social network platform on electronic device 104. In some embodiments, the electronic device is electronic device 104-1 in combination with external smart module 116 as shown in FIG. 1A. In some embodiments, the electronic device is electronic device 104-2 with internal smart module 118 as shown in FIG. 1B. In some embodiments, the chat interface can be a visual interface displayed on the electronic device, or an audio chat interface (e.g., the user sends an audio message 518 to control the machine, FIG. 5C).

The electronic device provides (604) a listing of social network contacts (e.g., listing 530, FIG. 5E) for a user account within the chat interface. The listing of social network contacts includes at least a first contact that is a human user (e.g., human contact 534, FIG. 5E), and at least a second contact that is a machine (e.g., machine contact 512, FIG. 5E).

In some embodiments, the electronic device establishes (606) a smart module (e.g., smart module 116 or 118, FIGS. 1A-1B) as the second contact. In some embodiments, the smart module can be part of the user device (e.g., internal smart module 118 running on electronic device 104-2, FIG. 1B), or another device that interact with the user device wirelessly or via a hardware port or wire (e.g., external smart module 116 running on electronic device 104-1, FIG. 1A).

In some embodiments, the electronic device receives (606) an identifier of the smart module. In some embodiments as shown in FIG. 5A, the identifier of the smart module is received by performing an interaction between the smart module and the electronic device, e.g., using the electronic device such as a mobile phone, to scan a barcode of the smart module; or by the user typing the identifier of the smart module on the mobile phone.

In some embodiments, the electronic device sends (606) a relationship establishment request to a server hosting the social network platform (e.g., server system 108, FIGS. 1A-1B and 2). The relationship establishment request includes the identifier of the smart module. In response to a confirmation from the server hosting the social network platform, the electronic device adds (606) a new contact in the listing of social network contacts for the user account to represent the smart module.

In some embodiments, the electronic device receives (608) a first information item specifying a first device type to be represented by the second contact. In response to receiving the first information item, the electronic device associates (608) the second contact with the first device type. In some embodiments, the electronic device receives the first information item from the smart module; and the smart module receives the first information item from a first machine by an interaction between the smart module and the first machine, such as scanning a barcode, reading a RFID tag. The first machine belongs to the first device type.

Figure 6A:
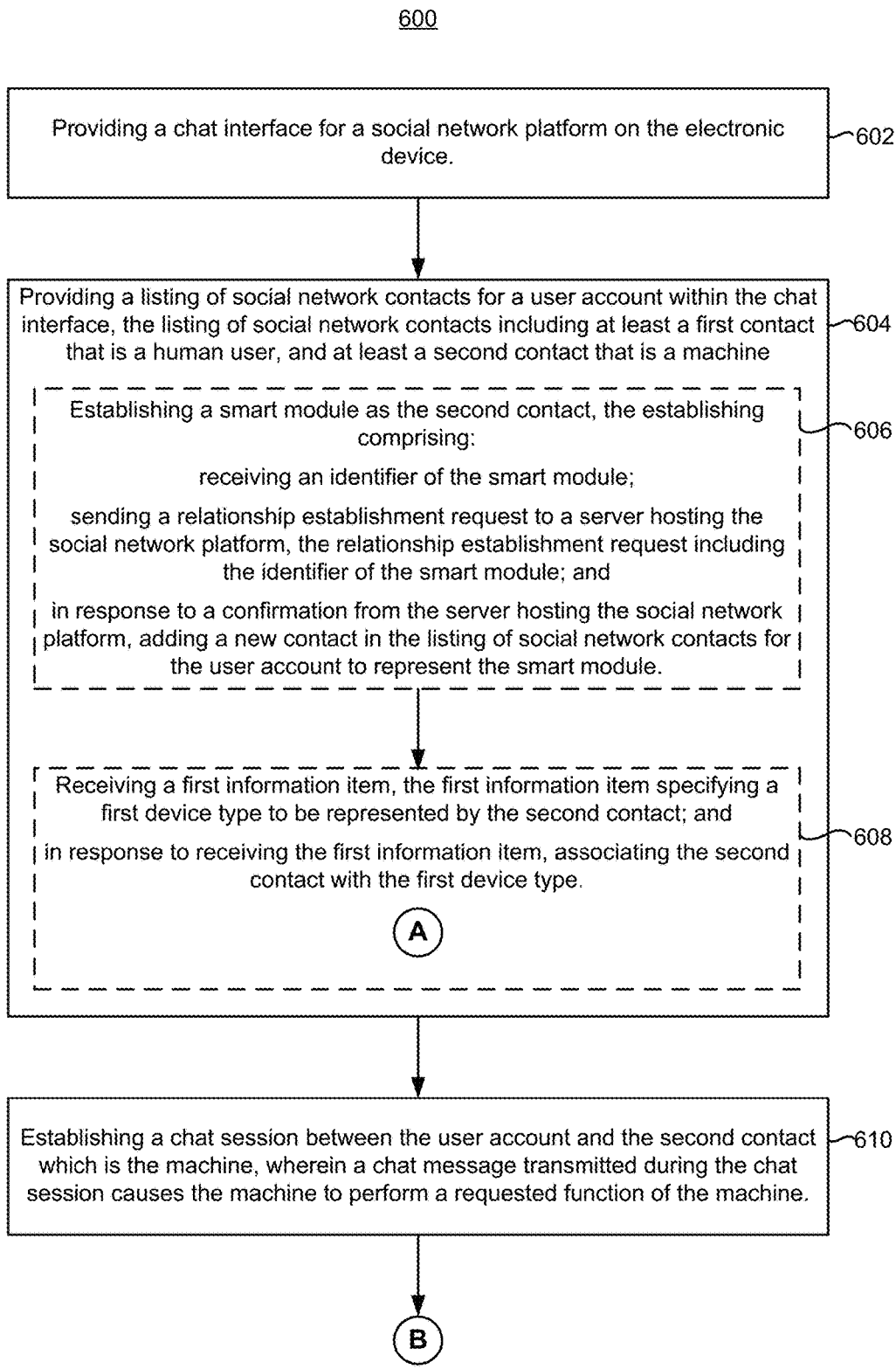
Figure 6B:
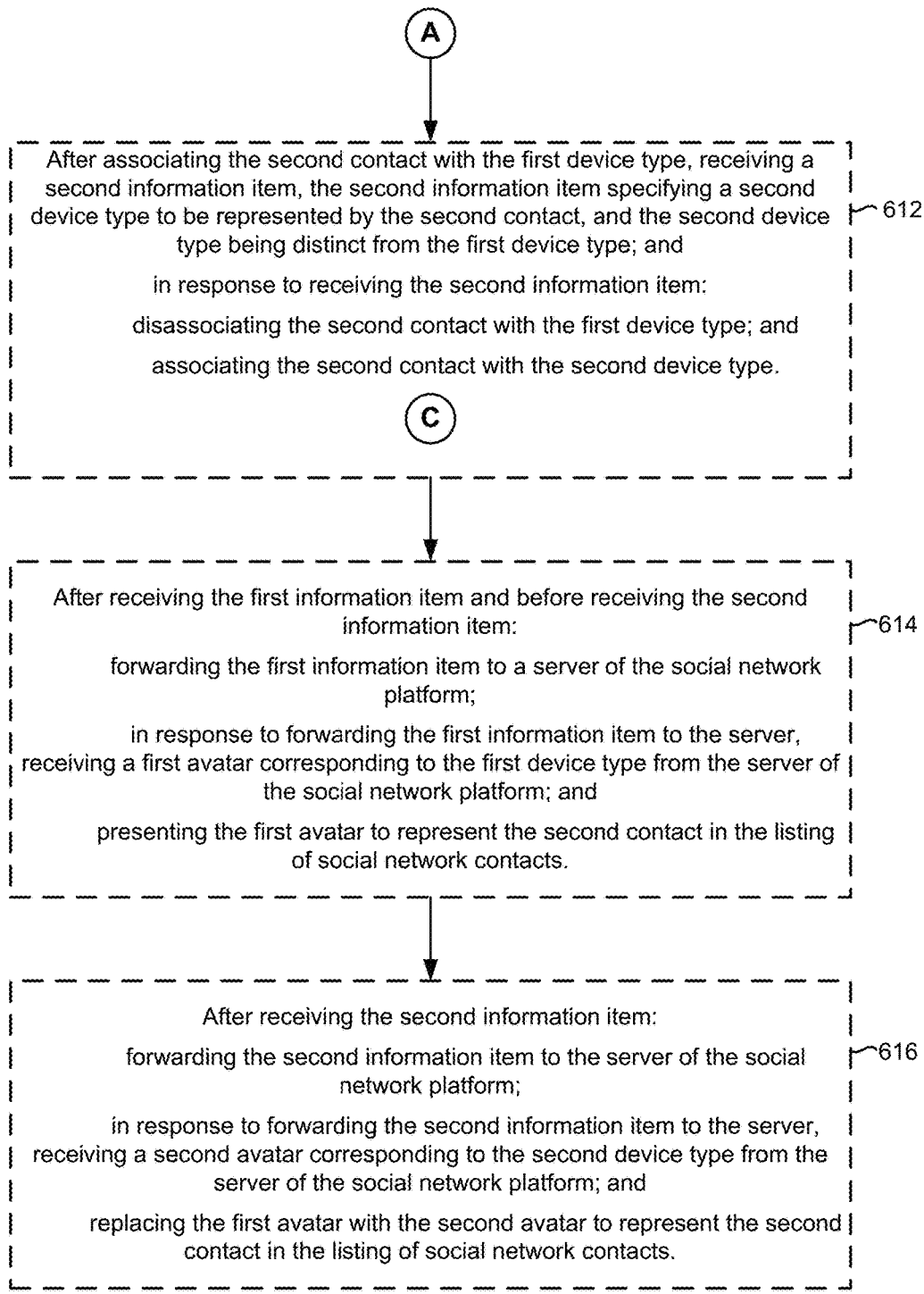

Referring to FIG. 6B, in some embodiments, after associating the second contact with the first device type, the electronic device receives (612) a second information item. The second information item specifies a second device type to be represented by the second contact, and the second device type is distinct from the first device type. In response to receiving the second information item, the electronic device receives disassociates (612) the second contact with the first device type and associates (612) the second contact with the second device type.

In some embodiments, the electronic device receives the second information item from the smart module; and the smart module receives the second information item from a second machine by an interaction between the smart module and the second machine, such as scanning a barcode, or reading a RFID tag. The second machine belongs to the second device type. This way, the same social network contact account can be used to communicate with different machines of different types at different times, as long as the user uses the second contact to represent one machine at a time (e.g., by putting the smart module on the machine, or touching the machine of choice).

Referring to FIG. 6E, in some embodiments, the first information item specifying the first device type and the second information item specifying the second device type are received (628) from a peripheral device transponder (e.g., transponder 150, FIGS. 1A-1B). In some embodiments, the peripheral device transponder obtains (628) the first information item from a first machine of the first device type, and the second information item from a second machine of the second device type.

In some embodiments, the peripheral device transponder obtains (630) the first information item by establishing physical or proximal contact with the first machine. The peripheral device transponder obtains (630) the second information item by establishing physical or proximal contact with the second machine. In some embodiments, the peripheral device transponder is removable, and can form a physical or proximal contact with the first machine when the user account is exchanging information with the first machine, and form another contact with the second machine when the user account is exchanging information with the second machine. The contact between the peripheral device transponder and the machine can be in any suitable form for information exchange, such as direct contact, wired connection, wireless coupling, and/or the like. In some examples, the peripheral device transponder establishes a contact with a corresponding machine by: (1) plugging in the transponder to a port of the corresponding machine; (2) attaching to the corresponding machine; (3) forming a near-field connection with the corresponding machine.

Referring back to FIG. 6B, after receiving the first information item and before receiving the second information item, the electronic device forwards (614) the first information item to a server of the social network platform. In response to forwarding the first information item to the server, the electronic device receives (614) a first avatar corresponding to the first device type from the server of the social network platform. The electronic device presents (614) the first avatar to represent the second contact in the listing of social network contacts.

In some embodiments, after receiving the second information item, the electronic device forwards (616) the second information item to the server of the social network platform. In response to forwarding the second information item to the server, the electronic device receives (616) a second avatar corresponding to the second device type from the server of the social network platform. The electronic device replaces (616) the first avatar with the second avatar to represent the second contact in the listing of social network contacts.

Referring back to FIG. 6A, the electronic device establishes (610) a chat session between the user account (e.g., user account 501, FIG. 5D) and the second contact which is the machine (e.g., machine contact 512, FIG. 5D) in some embodiments, a chat message (e.g., chat message 520, FIG. 5D) transmitted during the chat session causes the machine to perform a requested function of the machine. In some embodiments, the chat message is a text message or an audio message. The requested function performed to the machine is associated with an instruction included in the chat message.

Figure 6C:
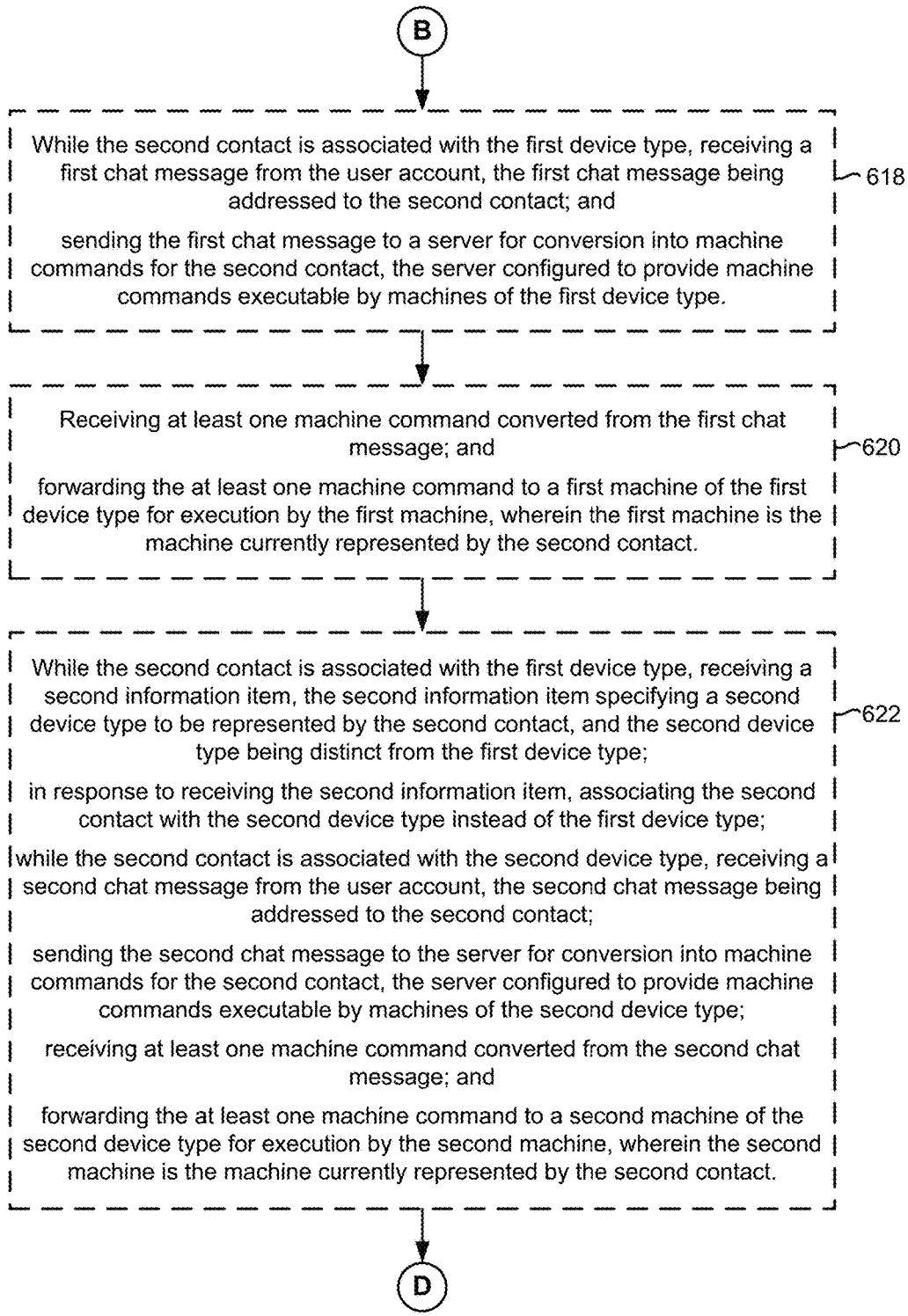

In some embodiments as shown in FIG. 6C, while the second contact is associated with the first device type, the electronic device receives (618) a first chat message from the user account, where the first chat message is addressed to the second contact. In some embodiments, the electronic device sends (618) the first chat message to a server for conversion into machine commands for the second contact. In some embodiments, the server is configured to provide machine commands executable by machines of the first device type, such as machine server 122-1 of FIGS. 1A-1B.

In some embodiments, when the chat message is an audio message, the electronic device, or the server hosting the social network platform may first convert the audio message into a text message before sending the chat message to a machine server for conversion. In some embodiments, after converting the chat message, the machine server for conversion directly sends the machine command to the first machine for execution; or the machine server for conversion sends the machine command to the server hosting the social network platform, and the server hosting the social network platform forwards the formatted command to the first machine. In some embodiments, the machine server (e.g., machine server 122-1) of the first device type is distinct from the machine server (e.g., machine server 122-2) of the second device type. In some embodiments, the machine server may be identified by the server system as a third-party server based on the device type, and have the identified third-party server provides the converted machine commands.

In some embodiments, the electronic device receives (620) at least one machine command converted from the first chat message; and forwards (620) the at least one machine command to a first machine of the first device type for execution by the first machine. The first machine is the machine currently represented by the second contact. In some embodiments, the electronic device forwards the machine command to the first machine via the smart module for execution by the first machine. After receiving the machine command, the first machine performs the requested function of the first machine.

In some embodiments, while the second contact is associated with the first device type, the electronic device receives (622) a second information item specifying a second device type to be represented by the second contact. The second device type is distinct from the first device type. In response to receiving the second information item, the electronic device associates (622) the second contact with the second device type instead of the first device type. While the second contact is associated with the second device type, the electronic device receives (622) a second chat message from the user account, the second chat message being addressed to the second contact. In some embodiments, the electronic device sends (622) the second chat message to the server (e.g., machine server 122) for conversion into machine commands for the second contact. The machine server is configured to provide machine commands executable by machines of the second device type. In some embodiments, the electronic device receives (622) at least one machine command converted from the second chat message; and forwards (622) the at least one machine command to a second machine of the second device type for execution by the second machine, wherein the second machine is the machine currently represented by the second contact.

Figure 6D:
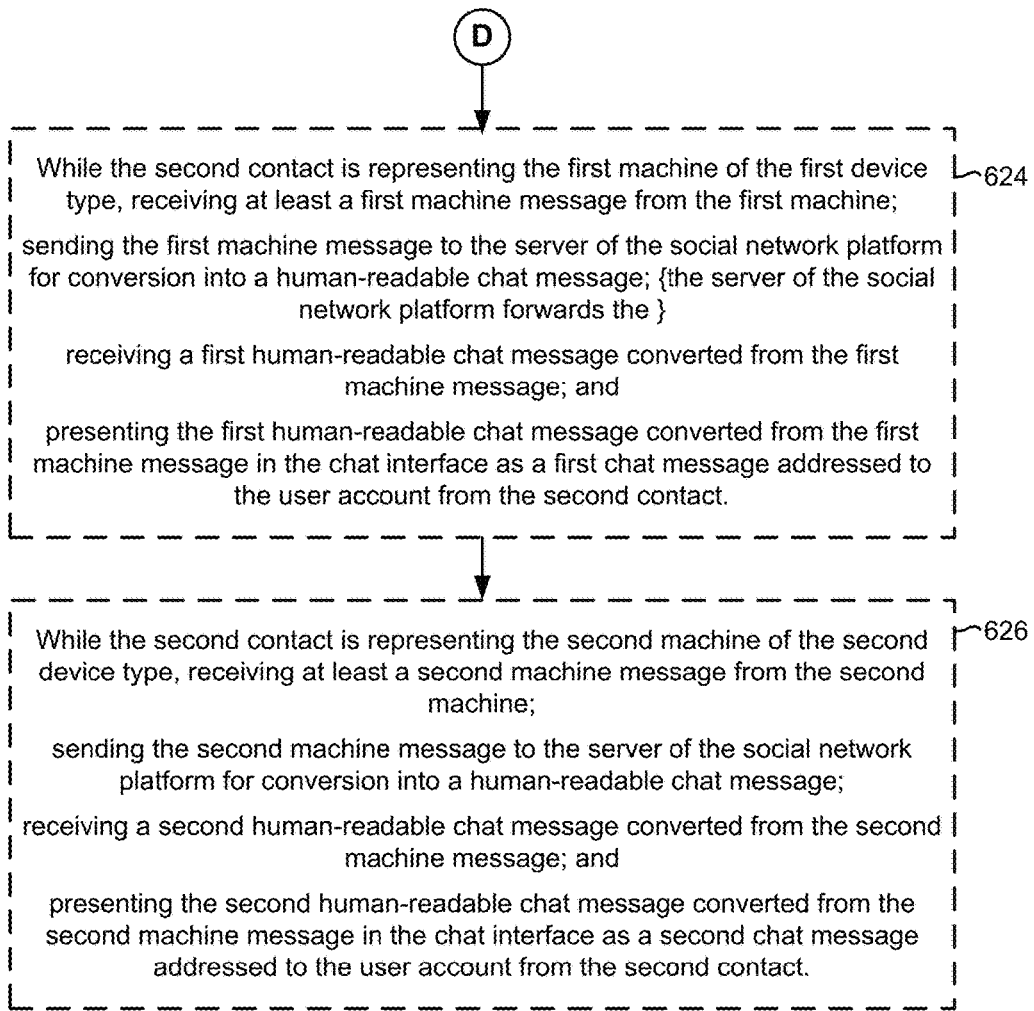

In some embodiments as shown in FIG. 6D, while the second contact is representing the first machine of the first device type, the electronic device receives (624) at least a first machine message from the first machine, and sends (624) the first machine message to the server of the social network platform for conversion into a human-readable chat message. In some embodiments, the electronic device receives (624) a first human-readable chat message converted from the first machine message; and presents (624) the first human-readable chat message converted from the first machine message in the chat interface as a first chat message addressed to the user account from the second contact.

In some embodiments, while the second contact is representing the second machine of the second device type, the electronic device receives (626) at least a second machine message from the second machine, and sends (626) the second machine message to the server of the social network platform for conversion into a human-readable chat message.

In some embodiments, the electronic device receives (626) a second human-readable chat message converted from the second machine message; and presents (626) the second human-readable chat message converted from the second machine message in the chat interface as a second chat message addressed to the user account from the second contact.

In some embodiments, when presenting chat messages from the second contact, the message optionally shows the sender's avatars. In this case, the avatars of the second contact will tell the user what machine the second contact is representing when each particular chat message was sent by the machine. For example as illustrated in FIGS. 5B-5D, in the same chat session log, the messages from the user will always show the user's avatar (e.g., user account 501), and the messages from the second contact may show the avatars representing different home appliances (e.g., fridge 512).

In some embodiments, the first machine command and the second command are in respective native command formats for the first device type and the second device type. In some embodiments, after receiving the machine messages from the corresponding machines, the electronic device forwards the machine messages to the server hosting the social network platform. The server hosting the social network platform forwards the first machine message to a first machine server configured to convert the first machine message into a first human-readable message, or forwards the second machine message to a second machine server configured to convert the second machine message into a second human-readable message. The first machine server and the second machine server are distinct from each other as shown in exemplary embodiments in FIGS. 1A-1B. In some embodiments, the server hosting the social network device receives the converted human-readable messages, and then forwards these messages to the electronic device to be viewed by the user account. In some embodiments, the human-readable messages are displayed on the electronic device to be viewed by the user of the electronic device. In some embodiments, the human-readable messages may be further converted to audio messages, such that the user can listen to the audio messages when they are played on the electronic device.

Each of the methods described herein is typically governed by instructions that are stored in a computer readable storage medium and that are executed by one or more processors of one or more servers or client devices. The above identified modules or programs (i.e., sets of instructions) need not be implemented as separate software programs, procedures or modules, and thus various subsets of these modules will be combined or otherwise re-arranged in various embodiments.

The foregoing description, for purpose of explanation, has been described with reference to specific embodiments. However, the illustrative discussions above are not intended to be exhaustive or to limit the disclosed technology to the precise forms disclosed. Many modifications and variations are possible in view of the above teachings. The embodiments were chosen and described in order to best explain the principles of the disclosed technology and its practical applications, to thereby enable others skilled in the art to best utilize the disclosed technology and various embodiments with various modifications as are suited to the particular use contemplated.

What is claimed is:

1. A method for controlling machines, comprising:
at an electronic device having one or more processors and memory:
providing a chat interface for a social network platform on the electronic device;
providing a listing of social network contacts for a user account within the chat interface, the listing of social network contacts including at least a first contact that is a human user, and at least a second contact that is a machine, wherein the second contact is added to the listing of social network contacts by establishing a smart module as the second contact in the listing of social network contacts, the smart module communicatively associated with the machine, wherein the establishing comprising:
receiving an identifier of the smart module;
sending a relationship establishment request to a first server hosting the social network platform, the relationship establishment request including the identifier of the smart module; and
in response to a confirmation from the first server hosting the social network platform, adding the second contact in the listing of social network contacts for the user account to represent the machine associated with the smart module;
establishing a chat session between the user account and the second contact which is the machine, wherein a chat message transmitted during the chat session causes the machine to perform a requested function of the machine;
receiving a first chat message from the user account, the first chat message being addressed to the second contact;
sending the first chat message to a second server for conversion into machine commands for the second contact;
receiving, from the second server, at least one machine command converted from the first chat message; and
forwarding the at least one machine command to the machine for execution by the machine which is currently represented by the second contact.

2. The method of claim 1, further comprising:
receiving a first information item, the first information item specifying a first device type to be represented by the second contact; and
in response to receiving the first information item, associating the second contact with the first device type.

3. The method of claim 2, further comprising:
after associating the second contact with the first device type, receiving a second information item, the second information item specifying a second device type to be represented by the second contact, and the second device type being distinct from the first device type; and in response to receiving the second information item:
disassociating the second contact with the first device type; and
associating the second contact with the second device type.

4. The method of claim 3, further comprising:
after receiving the first information item and before receiving the second information item:
forwarding the first information item to the first server of the social network platform;
in response to forwarding the first information item to the first server, receiving a first avatar corresponding to the first device type from the first server of the social network platform; and
presenting the first avatar to represent the second contact in the listing of social network contacts.

5. The method of claim 4, further comprising:
after receiving the second information item:
forwarding the second information item to the first server of the social network platform;
in response to forwarding the second information item to the first server, receiving a second avatar corresponding to the second device type from the first server of the social network platform; and
replacing the first avatar with the second avatar to represent the second contact in the listing of social network contacts.

6. The method of claim 2, wherein:
the first chat message is received while the second contact is associated with the first device type;
the second server is configured to provide machine commands executable by machines of the first device type; and
the at least one machine command is forwarded to a first machine of the first device type for execution by the first machine, wherein the first machine is the machine currently represented by the second contact.

7. The method of claim 6, further comprising:
while the second contact is associated with the first device type, receiving a second information item, the second information item specifying a second device type to be represented by the second contact, and the second device type being distinct from the first device type;
in response to receiving the second information item, associating the second contact with the second device type instead of the first device type;
while the second contact is associated with the second device type, receiving a second chat message from the user account, the second chat message being addressed to the second contact;
sending the second chat message to the second server for conversion into machine commands for the second contact, the second server configured to provide machine commands executable by machines of the second device type;
receiving at least one machine command converted from the second chat message; and
forwarding the at least one machine command to a second machine of the second device type for execution by the second machine, wherein the second machine is the machine currently represented by the second contact.

8. The method of claim 7, further comprising:

while the second contact is representing the first machine of the first device type, receiving at least a first machine message from the first machine;
sending the first machine message to the first server of the social network platform for conversion into a human-readable chat message;
receiving a first human-readable chat message converted from the first machine message; and
presenting the first human-readable chat message converted from the first machine message in the chat interface as a first chat message addressed to the user account from the second contact.

9. The method of claim 8, further comprising:
while the second contact is representing the second machine of the second device type, receiving at least a second machine message from the second machine;
sending the second machine message to the first server of the social network platform for conversion into a human-readable chat message;
receiving a second human-readable chat message converted from the second machine message; and
presenting the second human-readable chat message converted from the second machine message in the chat interface as a second chat message addressed to the user account from the second contact.

10. The method of claim 3, wherein the first information item specifying the first device type and the second information item specifying the second device type are received from a peripheral device transponder, and wherein the peripheral device transponder obtains the first information item from a first machine of the first device type, and the second information item from a second machine of the second device type.

11. The method of claim 10, wherein the peripheral device transponder obtains the first information item by establishing physical or proximal contact with the first machine, and wherein the peripheral device transponder obtains the second information item by establishing physical or proximal contact with the second machine.

12. An electronic device, comprising:
one or more processors; and
memory storing one or more programs to be executed by the one or more processors, the one or more programs comprising instructions for:
providing a chat interface for a social network platform on the electronic device;
providing a listing of social network contacts for a user account within the chat interface, the listing of social network contacts including at least a first contact that is a human user, and at least a second contact that is a machine, wherein the second contact is added to the listing of social network contacts by establishing a smart module as the second contact in the listing of social network contacts, the smart module communicatively associated with the machine, wherein the establishing comprising:
receiving an identifier of the smart module;
sending a relationship establishment request to a first server hosting the social network platform, the relationship establishment request including the identifier of the smart module; and
in response to a confirmation from the first server hosting the social network platform, adding the second contact in the listing of social network contacts for the user account to represent the machine associated with the smart module;

establishing a chat session between the user account and the second contact which is the machine, wherein a chat message transmitted during the chat session causes the machine to perform a requested function of the machine;

receiving a first chat message from the user account, the first chat message being addressed to the second contact;

sending the first chat message to a second server for conversion into machine commands for the second contact;

receiving, from the second server, at least one machine command converted from the first chat message; and forwarding the at least one machine command to the machine for execution by the machine which is currently represented by the second contact.

13. The electronic device of claim 12, wherein the one or more programs further comprise instructions for:

receiving a first information item, the first information item specifying a first device type to be represented by the second contact; and in response to receiving the first information item, associating the second contact with the first device type.

14. The electronic device of claim 13, wherein the one or more programs further comprise instructions for:

after associating the second contact with the first device type, receiving a second information item, the second information item specifying a second device type to be represented by the second contact, and the second device type being distinct from the first device type; and in response to receiving the second information item:
    disassociating the second contact with the first device type; and
    associating the second contact with the second device type.

15. A non-transitory computer readable storage medium storing one or more programs, the one or more programs comprising instructions, which, when executed by an electronic device with one or more processors, cause the electronic device to perform operations comprising:

providing a chat interface for a social network platform on the electronic device;

providing a listing of social network contacts for a user account within the chat interface, the listing of social network contacts including at least a first contact that is a human user, and at least a second contact that is a machine, wherein the second contact is added to the listing of social network contacts by establishing a smart module as the second contact in the listing of social network contacts, the smart module communicatively associated with the machine, wherein the establishing comprising:
    receiving an identifier of the smart module;
    sending a relationship establishment request to a first server hosting the social network platform, the relationship establishment request including the identifier of the smart module; and
    in response to a confirmation from the first server hosting the social network platform, adding the second contact in the listing of social network contacts for the user account to represent the machine associated with the smart module;

establishing a chat session between the user account and the second contact which is the machine, wherein a chat message transmitted during the chat session causes the machine to perform a requested function of the machine;

sending the first chat message to a second server for conversion into machine commands for the second contact;

receiving, from the second server, at least one machine command converted from the first chat message; and forwarding the at least one machine command to the machine for execution by the machine which is currently represented by the second contact.

16. The non-transitory computer readable storage medium of claim 15, wherein the one or more programs further comprise instructions which cause the electronic device to perform operations comprising:

receiving a first information item, the first information item specifying a first device type to be represented by the second contact; and in response to receiving the first information item, associating the second contact with the first device type.

17. The non-transitory computer readable storage medium of claim 16, wherein the one or more programs further comprise instructions which cause the electronic device to perform operations comprising:

after associating the second contact with the first device type, receiving a second information item, the second information item specifying a second device type to be represented by the second contact, and the second device type being distinct from the first device type; and in response to receiving the second information item:
    disassociating the second contact with the first device type; and
    associating the second contact with the second device type.

* * * * *